United States Patent
Matsuzaki et al.

(10) Patent No.: US 7,383,902 B2
(45) Date of Patent: Jun. 10, 2008

(54) HYBRID CAR AND CONTROL APPARATUS THEREFOR, AND HYBRID FOUR-WHEEL-DRIVE CAR AND CONTROL APPARATUS THEREFOR

(75) Inventors: Norikazu Matsuzaki, Mito (JP);
Masaru Ito, Hitachinaka (JP);
Tatsuyuki Yamamoto, Mito (JP);
Takehiko Kowatari, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 222 days.

(21) Appl. No.: 10/739,058

(22) Filed: Dec. 19, 2003

(65) Prior Publication Data

US 2004/0163860 A1   Aug. 26, 2004

(30) Foreign Application Priority Data

Dec. 20, 2002   (JP) ............................. 2002-369166
Apr. 1, 2003    (JP) ............................. 2003-097701

(51) Int. Cl.
*B60K 6/20*   (2007.10)

(52) U.S. Cl. .................. 180/65.2; 180/65.3; 180/65.4; 180/65.8; 701/22

(58) Field of Classification Search .......... 180/65.2–4, 180/65.8, 69.3, 243; 701/22, 69
See application file for complete search history.

(56) References Cited

U.S. PATENT DOCUMENTS 4,634,887 A * 1/1987 Balch et al. .................. 290/3

6,175,217 B1 * 1/2001 Da Ponte et al. ............. 322/19
6,442,454 B1 * 8/2002 Akiba et al. .................. 701/22
2002/0087252 A1   7/2002 Smimizu et al.

FOREIGN PATENT DOCUMENTS

| JP | 07-107626 A | 4/1995 |
| JP | 8-175210 A | 7/1996 |
| JP | 08-300965 | 11/1996 |

(Continued)

OTHER PUBLICATIONS

*Nikkel Mechanical* Issue No. 578 (2002) pp. 53-58 and accompanying English abstract.

(Continued)

*Primary Examiner*—Christopher P. Ellis
*Assistant Examiner*—Vaughn T Coolman
(74) *Attorney, Agent, or Firm*—Crowell & Moring LLP

(57) ABSTRACT

In a hybrid car, or an electric motor-driven four-wheel-drive vehicle, in which an electric motor is driven directly by an output from a generator, vehicle running performance is enhanced. The output from the generator is controlled so as to maintain a generator torque in a range, in which the vehicle does not stall. Specifically, a driving apparatus for the hybrid car includes a second generator 2 driven by an engine 1 for driving one pair of either front or rear wheels 14, 15, an electric motor 5 driven through directly receiving the output from the second generator 2 and driving the other pair of either the front or rear wheels 14, 15, and a four-wheel-drive control unit 6 controlling driving of the second generator 2 and the electric motor 5. When the engine 1 is in an overloaded condition, the four-wheel-drive control unit 6 limits the output of the second generator 2.

20 Claims, 21 Drawing Sheets

FOREIGN PATENT DOCUMENTS

| | | |
|---|---|---|
| JP | 08300965 A | 11/1996 |
| JP | 2000-272360 | 10/2000 |
| JP | 2000-272367 | 10/2000 |
| JP | 200272360 A | 10/2000 |
| JP | 2001-63392 | 3/2001 |
| JP | 2001063392 A | 3/2001 |
| JP | 2002-211269 A | 7/2002 |
| JP | 2002-218605 | 8/2002 |
| JP | 2002-235576 | 8/2002 |
| JP | 2002-235576 A | 8/2002 |
| JP | 2002218605 A | 8/2002 |
| JP | 2000272367 A | 10/2002 |
| JP | 2002-325309 | 11/2002 |
| JP | 2002-325309 A | 11/2002 |

OTHER PUBLICATIONS

Japanese Office Action dated Sep. 5, 2006 with English Translation (Three (3) pages).

Japanese Office Action dated Jul. 10, 2007 with English Translation (Five (5) pages).

* cited by examiner

FIG. 10

| GENERATOR VOLTAGE [%] | GENERATOR SPEED [rpm] | | | | | | | | | | | | | | | | |
|---|---|---|---|---|---|---|---|---|---|---|---|---|---|---|---|---|---|
| | 1200 | 1600 | 2000 | 2400 | 2800 | 3200 | 3600 | 4000 | 4400 | 4800 | 5200 | 5600 | 6000 | 6400 | 6800 | 7200 | 7600 |
| 0 | *** | *** | *** | *** | *** | *** | *** | *** | *** | *** | *** | *** | *** | *** | *** | *** | *** |
| 5 | *** | *** | *** | *** | *** | *** | *** | *** | *** | *** | *** | *** | *** | *** | *** | *** | *** |
| 10 | *** | *** | *** | *** | *** | *** | *** | *** | *** | *** | *** | *** | *** | *** | *** | *** | *** |
| 15 | *** | *** | *** | *** | *** | *** | *** | *** | *** | *** | *** | *** | *** | *** | *** | *** | *** |
| 20 | *** | *** | *** | *** | *** | *** | *** | *** | *** | *** | *** | *** | *** | *** | *** | *** | *** |
| 25 | *** | *** | *** | *** | *** | *** | *** | *** | *** | *** | *** | *** | *** | *** | *** | *** | *** |
| 30 | *** | *** | *** | *** | *** | *** | *** | *** | *** | *** | *** | *** | *** | *** | *** | *** | *** |
| 35 | *** | *** | *** | *** | *** | *** | *** | *** | *** | *** | *** | *** | *** | *** | *** | *** | *** |
| 40 | *** | *** | *** | *** | *** | *** | *** | *** | *** | *** | *** | *** | *** | *** | *** | *** | *** |
| 45 | *** | *** | *** | *** | *** | *** | *** | *** | *** | *** | *** | *** | *** | *** | *** | *** | *** |
| 50 | *** | *** | *** | *** | *** | *** | *** | *** | *** | *** | *** | *** | *** | *** | *** | *** | *** |
| 60 | *** | *** | *** | *** | *** | *** | *** | *** | *** | *** | *** | *** | *** | *** | *** | *** | *** |
| 70 | *** | *** | *** | *** | *** | *** | *** | *** | *** | *** | *** | *** | *** | *** | *** | *** | *** |
| 80 | *** | *** | *** | *** | *** | *** | *** | *** | *** | *** | *** | *** | *** | *** | *** | *** | *** |
| 90 | *** | *** | *** | *** | *** | *** | *** | *** | *** | *** | *** | *** | *** | *** | *** | *** | *** |
| 100 | *** | *** | *** | *** | *** | *** | *** | *** | *** | *** | *** | *** | *** | *** | *** | *** | *** |

HYBRID CAR AND CONTROL APPARATUS THEREFOR, AND HYBRID FOUR-WHEEL-DRIVE CAR AND CONTROL APPARATUS THEREFOR

BACKGROUND OF THE INVENTION

1. Field of the Invention

The present invention relates to a hybrid car having an internal combustion engine and an electric motor as driving sources and a driving apparatus therefor. The present invention also relates to a hybrid type four-wheel-drive car having a transmission with a clutch and a control apparatus therefor.

2. Description of the Related Art

Examples of hybrid cars having an internal combustion engine and an electric motor as driving sources are known from Japanese Patent Laid-open Nos. 2000-272367 and 2001-63392. Disclosed in Japanese Patent Laid-open No. 2000-272367 is a four-wheel driving apparatus, in which a generator is driven by an engine driving a front wheel and an electric power generated by the generator is used to drive an electric motor driving a rear wheel (refer, for example, to page 3 and FIG. 1 of Japanese Patent Laid-open No. 2000-272367). In Japanese Patent Laid-open No. 2001-63392, a front-and-rear wheel drive vehicle is disclosed, in which an engine driving a front wheel drives a generator, while a motor generator driving a rear wheel is driven by an electric power generated by a generator and supplied by way of an inverter or an electric power accumulated in a capacitor (refer, for example, to page 3 and FIG. 1 of Japanese Patent Laid-open No. 2001-63392).

A hybrid four-wheel-drive car having an engine for driving either pair of front or rear wheels and a motor for driving the other pair of wheels, either front or rear, is disclosed, for example, in Japanese Patent Laid-open Nos. 2002-218605 and Hei 8-300965 and in the November issue (No. 578) of "Nikkei Mechanical" (pp. 53 to 58). An automatic manual transmission for a parallel type hybrid car is disclosed, for example, in Japanese Patent Laid-open No. 2000-272360.

Disclosed in Japanese Patent Laid-open No. 2002-218605 among other prior art techniques is a control apparatus of a driving force for a vehicle provided with an internal combustion engine driving at least either pair of front or rear driving wheels and a generator driven by the power from the internal combustion engine. This driving force control apparatus for a vehicle is provided with driving wheel slip estimation means that estimates whether or not the driving wheels slip during acceleration. The control apparatus is further provided with generator control means that is activated when the driving wheel slip estimation means estimates that the driving wheels slip in acceleration and controls so as to bring torque of the generator to a level equivalent to a power generating load torque corresponding to the amount of acceleration slip the driving wheels make.

Disclosed in Japanese Patent Laid-open No. Hei 8-300965 is a front-and-rear wheel drive vehicle having an engine for driving either pair of front or rear wheels and an electric motor for driving the other pair of wheels, either front or rear. This front-and-rear wheel drive vehicle is provided with means for detecting the value of $\mu$ on a road surface. The vehicle is further provided with control means that operates the electric motor so as to bring an output torque of the electric motor to a predetermined value corresponding to the detected value of $\mu$ when the vehicle is started with the detected value of $\mu$ being a predetermined value or less.

In an electric motor-driven four-wheel-drive vehicle, in which the electric motor is driven directly by an output from a generator (hereinafter referred to as the "motor-driven four-wheel-drive vehicle"), the following control is provided. Specifically, when, for example, an attempt is made to start a vehicle or get the vehicle out of a rut, in which case there is a great torque requirement with a low vehicle speed, a current value and a voltage value of a power output from the generator are controlled so that a large current value and a small voltage value of a power input to the electric motor are provided. While the vehicle is running, in which case there is a small torque demand with a high vehicle speed, on the other hand, the current value and the voltage value of the power output from the generator are controlled so that the small current value and the large voltage value of the power input to the electric motor are provided. That is, the motor-driven four-wheel-drive vehicle is controlled so that the maximum torque is output from the electric motor when the vehicle is started and the torque of the electric motor decreases as the vehicle speed increases.

According to such control as mentioned above, driving performance comparable with that offered by a mechanical type four-wheel-drive vehicle can be provided by the motor-driven four-wheel-drive vehicle over a wide operating range. There is, in the motor-driven four-wheel-drive vehicle, a need for improving vehicle running performance even further so as to bring it near that achieved in a mode in which two wheels are driven (hereinafter referred to as the two-wheel-drive mode).

In Japanese Patent Laid-open No. 2000-272360, an automatic clutch type transmission mounted in a two-wheel-drive parallel hybrid car is disclosed for improved fuel economy. It is, however, difficult to apply this clutch type transmission to a four-wheel-drive hybrid car having an engine for driving either pair of front or rear wheels and a motor for driving the other pair of wheels, either front or rear. Japanese Patent Laid-open Nos. 2002-218605 and Hei 8-300965 are not, on the other hand, concerned with disconnection of torque generated when the clutch is disengaged during a gearshift. Unless a driving force is obtained during a gearshift, there is likelihood that acceleration performance will be degraded during a gearshift, performance in getting the vehicle out of mud will be degraded, and other performance degradation will result.

To solve these problems, it will readily occur to those skilled in the art that, in the hybrid car using the clutch type transmission, a battery or a capacitor mounted therein is used during a gearshift to apply an electric power to the motor when the clutch is disengaged, thereby obtaining a driving force. Simply detecting a disengaged condition of the clutch and letting the motor generate torque could give a driver an awkward feeling that does not exactly match his or her intention. There is still another problem that the battery and capacitor are expensive. There is therefore a need for obtaining the driving force using a simpler and easier method.

SUMMARY OF THE INVENTION

In view of the foregoing need, the inventors focused attention on the fact that, in the vehicle running performance of the motor-driven four-wheel-drive vehicle, vehicle acceleration performance thereof is smaller than that in the two-wheel-drive mode. The inventors thereby researched into possible ways of enhancing the vehicle acceleration performance from the viewpoint of a drive system composed of the electric motor as the driving source of the vehicle, the generator as the driving source of the electric motor, and a control unit controlling the electric motor and the generator. Through the research, the inventors found a symptom, in which the difference in acceleration performance between a four-wheel-drive mode and the two-wheel-drive mode becomes great when the vehicle is started. It was also found that this symptom was particularly conspicuous when the vehicle was started on a dry surface road. It was further found that the symptom was particularly obvious in a four-wheel-drive vehicle mounted with an internal combustion engine with a displacement of 1,500 cc or less.

A possible factor responsible for this symptom is maximum torque control provided when the vehicle is started. Specifically, a generator output control is provided to ensure an output of the maximum torque of the electric motor when the vehicle is started. This generator output control makes a great generator torque (a load torque of the internal combustion engine) given by the generator to the internal combustion engine. The resultant generator torque exceeds an internal combustion engine permissible torque, of which the generator is allowed to deprive. As a result, a required internal combustion engine torque corresponding to a driver's torque requirement is not transmitted from the internal combustion engine to wheels (that is, the internal combustion engine runs into an overloaded condition), causing the vehicle to stall. Thus is the possible factor.

It is therefore an object of the present invention to provide a driving apparatus for a hybrid car capable of improving vehicle running performance. Specifically, the present invention is directed to a hybrid car that is an electric motor-driven four-wheel-drive vehicle, in which the electric motor is driven directly by an output from a generator. The present invention provides a driving apparatus for the hybrid car capable of improving vehicle running performance by suppressing stalling of the car occurring as a result of the output control of the generator. The present invention also provides a driving apparatus for the hybrid car capable of improving vehicle running performance without inviting degradation of driving performance offered by the four-wheel-drive vehicle. The present invention further provides a hybrid car provided with the driving apparatus.

The present invention is primarily characterized in that the output of the generator is controlled so as to maintain the generator torque within a range through which the car does not stall. Specifically, the present invention is directed to a driving apparatus for a hybrid car provided with the following components: namely, a generator driven by an internal combustion engine driving either pair of front or rear wheels, an electric motor driven through directly receiving an output from the generator and driving the other pair of wheels, either front or rear, and a control unit controlling driving of the generator and the electric motor. The present invention is characterized in that the control unit limits the output of the generator when the internal combustion engine is in an overloaded condition. The output of the generator may be limited when the internal combustion engine can run into the overloaded condition.

In accordance with the present invention offering such solving means, the generator torque can be made small so as to fall within the range of the internal combustion engine permissible torque when the generator torque becomes so large as to exceed the internal combustion engine permissible torque, for example, when the car is started on a dry surface road. According to the present invention, therefore, it is possible to suppress car stalling occurring from the generator output control. Vehicle running performance, or vehicle acceleration performance in particular, of the hybrid car can therefore be enhanced.

The present invention also provides the control unit with the function of increasing a field current of the electric motor when limiting the output of the generator. According to the present invention, therefore, there is no chance of inviting degradation of the driving performance offered by the four-wheel-drive vehicle.

Preferably, the control unit determines that the internal combustion engine is in the overloaded condition based on the fact that the generator torque has exceeded the internal combustion engine permissible torque. The control unit may determine that the internal combustion engine is overloaded when it is detected that the internal combustion engine develops detonation. Or, the control unit may instead determine that the internal combustion engine is overloaded when vehicle acceleration has exceeded estimated vehicle acceleration. Or, the control unit may determine that the internal combustion engine is overloaded when the generator torque has exceeded a generator permissible torque, with which a predetermined level of vehicle acceleration or more can be retained, even when the generator torque is given to the internal combustion engine.

The generator is provided independently of an auxiliary generator driven by the internal combustion engine. The generator is used exclusively for driving the electric motor when the electric motor is operated to give an assist drive. Further, the generator is to offer an output greater than the auxiliary generator.

According to the present invention, since the output of the generator is controlled so as to maintain the generator torque within a range through which the car does not stall, vehicle acceleration performance can be enhanced. Therefore, the present invention provides the hybrid car capable of improving vehicle running performance and the driving apparatus therefor.

The present invention provides a hybrid four-wheel-drive car and a control unit therefor, preventing acceleration performance during a gearshift and performance to get the car out of the mud from being degraded, thereby obtaining a driving force and allowing control so as to match driver's intention.

The hybrid four-wheel-drive car is typically provided with the following components. Specifically, an engine driving either pair of front or rear wheels; a motor driving the other pair of front or rear wheels; a generator driven by the engine and supplying the motor with an electric power; a clutch provided between an output shaft of the engine and an input shaft of a transmission and connecting and disconnecting a driving force; a transmission provided between the clutch and the wheels driven by the engine, and selecting one gear ratio from among a plurality of predetermined gear ratios and reducing and outputting a speed of the engine; a clutch position detecting device detecting the position of the clutch; an accelerator pedal sensor detecting the amount of an accelerator pedal depressed; a device detecting or estimating torque of the generator; a gear ratio detecting device detecting the selected gear ratio; and a controller detecting outputs from the clutch position detecting device, the accelerator pedal sensor, and the gear ratio detecting device and controlling the amount of electric power generated by the generator and the output of the engine. The present invention provides a controller (control unit) for a hybrid four-wheel-drive car that allows the motor to produce torque when the clutch position detecting device detects that the clutch is disengaged and that the gear ratio detecting device detects that a gear ratio is selected (that is, in a non-neutral condition). These arrangements as described in the foregoing make it possible to reduce loss of the driving force transmitted from the engine to the wheels, leading to an increased fuel economy. Further, during an upshift (for example, in a gearshift from a 1st speed to a 2nd speed) involving the clutch being disengaged, torque is output from the motor to obtain the driving force of the car. This improves acceleration performance and performance to get the car out of the mud. At the same time, even at a time of getting the car started (shifting gear from neutral to the 1st speed), the clutch is disengaged and a starting gear ratio is selected; when the accelerator pedal is thereafter depressed, a drive by the motor is started before the clutch is completely engaged. This allows the car speed to pick up quickly.

The present invention further provides the controller that, to generator torque from the motor, issues a command to increase the amount of electric power generated by the generator, while increasing the output of the engine. In accordance with the present invention, the amount of electric power generated by the generator can be obtained by increasing the output from the engine, which allows the output from the motor to be increased. The driving force can there be obtained without depending on the electric power provided by the battery or the capacitor.

In accordance with the present invention, it is possible to reduce loss of the driving force transmitted from the engine to the wheels. This leads to the increased fuel economy. Further, during an upshift (for example, in a gearshift from the 1st speed to the 2nd speed) involving the clutch being disengaged, torque is output from the motor to obtain the driving force of the car. This improves acceleration performance and performance to get the car out of the mud. In addition, since the drive by the motor is started before the clutch is completely engaged, the control unit for the hybrid four-wheel-drive car ensuring a quick pickup of car speed can be provided.

BRIEF DESCRIPTION OF THE DRAWINGS

Other objects and advantages of the invention will become apparent from the following description of embodiments with reference to the accompanying drawings in which:

FIG. 10 is a table showing an efficiency characteristic map of a second generator 2 representing a relation between a voltage generated by the second generator 2 and a speed of the second generator 2, making up part of data stored in a memory of the four-wheel-drive control unit shown in FIG. 1;

DETAILED DESCRIPTION OF THE PREFERRED EMBODIMENTS

Figure 1:
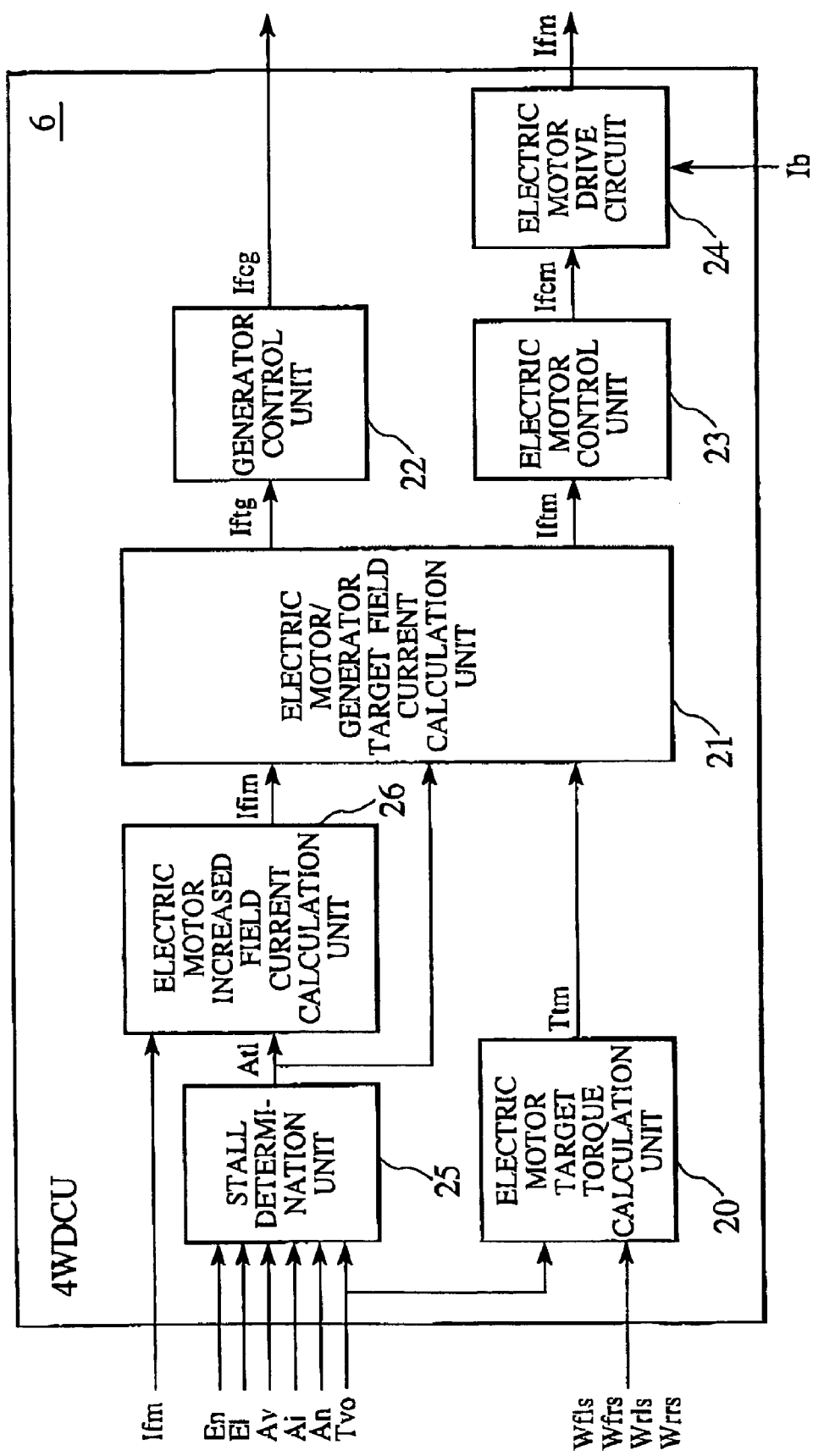
FIG. 1 is a block diagram showing the configuration of a four-wheel-drive control unit for a hybrid car according to a first embodiment of the present invention.

A first preferred embodiment according to the present invention will be described with reference to FIGS. 1 through 11. FIG. 3 shows an overall configuration of a hybrid car (hereinafter referred to as an "HEV"), or an electric motor-driven four-wheel-drive vehicle, according to the embodiment of the present invention. Referring to FIG. 3, reference numeral 1 represents a prime mover forming one of driving sources for the HEV, and more specifically, an engine serving as an internal combustion engine that burns fuel inside cylinders therein for combustion. Reference numeral 5 represents another prime mover forming another driving source for the HEV, and more specifically, an electric motor as a rotary electrical machine converting electric energy into mechanical energy.

The engine 1 is of a type having a displacement of about 1400 cc and the maximum torque of about 130 N.m/rpm. An output shaft of the engine 1 is mechanically connected to a driving shaft of front wheels 14 by way of an automatic transmission (T/M) 12. An output from the engine 1 undergoes speed and power changes through the transmission 12 before being transmitted to the driving shaft of the front wheels 14. The front wheels 14 are rotated by the output from the engine 1 transmitted to the driving shaft thereof. A first generator (ALT1) 13 and a second generator (ALT2) 2 are each connected to the engine 1 by way of a belt. Each of the first generator 13 and the second generator 2 is driven by the engine 1, generating required output power. In the first embodiment of the present invention, an automatic type is used for the transmission 12. A manual transmission may nonetheless be used, instead.

The electric motor 5 is a DC motor of a separately excited shunt type capable of easy changeover between forward rotation and backward rotation. The electric motor 5 directly receives the output power of the second generator 2 to be drivingly rotated. An output shaft of the electric motor 5 is mechanically connected to a driving shaft of rear wheels 15 via a clutch (CL) 4 and a differential gear (hereinafter referred to as a"DEF") 3. When the clutch 4 is engaged, an output from the electric motor 5 is transmitted to the driving shaft of the rear wheels 15 by way of the clutch 4 and the DEF 3. The rear wheels 15 are drivingly rotated by the output of the electric motor 5 transmitted to the driving shaft thereof. When the clutch 4 is disengaged, the output of the electric motor 5 is not transmitted to the driving shaft of the rear wheels 15. A battery 11 is electrically connected to a field winding 5a of the electric motor 5 via a drive circuit to be described later. The drive circuit controls and supplies power output from the battery 11. The second generator 2 is electrically connected to an armature winding 5b of the electric motor 5 through a relay 7. Power generated and controlled by the second generator 2 is directly supplied to the armature winding 5b of the electric motor 5.

As described above, the two circuits are provided for the power source of the electric motor 5. This arrangement makes it possible to control the electric motor 5 in two methods, one controlling the field current of the second generator 2 and the other controlling the field current of the electric motor 5. For example, when a required speed of the electric motor 5 is low and a required torque of the same is high, such as when an attempt is made to start the vehicle or get the vehicle out of a rut, the output current value of the second generator 2 is made large, while the output of the electric motor 5 is made to produce a low speed and a high torque. When the required speed of the electric motor 5 is high and the required torque of the same is low, such as while the vehicle is running at a low speed (for example, at 15 to 20 km/h), on the other hand, the output voltage value of the second generator 2 is made large and the output of the electric motor 5 is made to produce a high speed and a low torque.

Furthermore, by decreasing the field current of the electric motor 5, it is possible to increase the speed of the electric motor 5, while improving response when the vehicle runs at low speeds. When, for example, a torque distribution requested value of the front wheels 14 is greater than that of the rear wheels 15, a torque distribution between the front wheels 14 and the rear wheels 15 can be varied by decreasing the field current value of the second generator 2. In addition, the field current values of the second generator 2 and the electric motor 5 may be controlled within permissible ranges of the second generator 2, the electric motor 5, and the battery 11. This allows the electric motor 5 to be driven in a range covering even higher outputs and even lower outputs. In accordance with the preferred embodiment of the present invention, therefore, it is possible to derive a sufficient driving power covering a wide range from the start to low-speed running (at about 20 km/h). Control can thus be provided permitting the free choice of any running mode that the four-wheel-drive vehicle must have.

The motor-driven four-wheel-drive vehicle according to the first preferred embodiment of the present invention has the arrangement in which the engine 1 drivingly rotates the front wheels 14 and the electric motor 5 drivingly rotates the rear wheels 15. Arrangement can nonetheless be configured so that the engine 1 drivingly rotates the rear wheels 15 and the electric motor 5 drivingly rotates the front wheels 14. Furthermore, an AC motor may be used instead of the DC motor used as the electric motor 5 according to the first embodiment of the present invention.

The battery 11 is of a type having a discharge voltage of about 12 V. The first generator 13 is electrically connected to the battery 11. Power generated and controlled by the first generator 13 is thus supplied to the battery 11. The first generator 13 is an air-cooled machine having the maximum output voltage of about 14 V and the maximum output of about 2 kW. The first generator 13 is dedicated to auxiliaries, forming a charging and generating system with the battery 11 supplying power for a low-voltage system, or a 12-V constant voltage system. The constant voltage system is composed of vehicle electric machine loads for the HEV including, for example, an electric motor for driving a compressor compressing an air-conditioning medium, lighting devices, a starter starting the engine 1, and the like. The first generator 13 is an open machine and is therefore disposed at a level higher than the second generator 2 in relation to the engine 1, that is, a position away from the ground surface.

Power supplied from the battery 11 is supplied to the field winding 5a of the electric motor 5 and the aforementioned vehicle electrical loads. In addition to these, the power is supplied to the first generator 13 and the second generator 2 as an excitation power when the first generator 13 itself and the second generator 2 itself are unable to excite the corresponding field windings, such as when the engine 1 is started. For this reason, the second generator 2 is connected to the battery 11. When the output of the electric motor 5 is not transmitted to the rear wheels 15 with the clutch 4 disengaged, that is, in the two-wheel drive mode, therefore, the power generated and controlled by the second generator 2 can be supplied to the battery 11. The power generated and controlled by the second generator 2 can also be supplied as a driving power to other vehicle electrical loads, especially those of high voltages.

The second generator 2 is a water-cooled machine having the maximum output voltage of about 42 V and the maximum output of about 8 kW. The second generator 2 is dedicated to driving, forming a variable-voltage (high voltage system) power generation system supplying a wide range of power exclusively to the electric motor 5. The second generator 2 is a closed machine and thus disposed at a level lower than the first generator 13 in relation to the engine 1, that is, a position closer to the ground surface. In accordance with the first embodiment of the present invention, therefore, there is no chance of the second generator 2 drawing in a substance promoting rust or foreign matter causing a failure. Even if the generator is splashed with or submerged in water while the vehicle is running, there is almost no likelihood that water or other foreign matter will enter the generator. In addition, according to the first embodiment of the present invention, high-voltage electric leakage, thermal resistance, and the like are taken into consideration and the output voltage for the second generator 2 is set to 50 V or less.

An engine control unit (hereinafter referred to as an "ECU") 8 controls driving of the engine 1. In accordance with a torque requirement command issued by a driver (the amount of accelerator pedal depression), the ECU 8 controls driving of an electronic control throttle for controlling the amount of air supplied to the engine 1 and the like, thereby controlling driving of the engine 1. The engine 1 then produces an output of an engine torque corresponding to the torque requirement command issued by the driver. To accomplish this task, vehicle operating state variables (for example, the speed of the engine 1) and the like required for controlling the driving of the engine 1 are input to the ECU 8. In addition, data (map), a control program, and the like preset based on the specifications of the engine 1 are stored in a memory provided in the ECU 8.

The ECU 8 also controls the driving of the first generator 13. According to the amount of electricity still available for use in the battery 11, the ECU 8 controls the field current flowing through the field winding of the first generator 13, thereby controlling the driving of the first generator 13. The first generator 13 thereby generates an output power corresponding to the amount of electricity still available for use in the battery 11. To accomplish this task, vehicle operating state variables (for example, operating conditions of electrical loads) and the like required for controlling the driving of the first generator 13 are input to the ECU 8. In addition, data (map), a control program, and the like preset based on the specifications of the first generator 13 are stored in the memory provided in the ECU 8.

A transmission control unit (hereinafter referred to as a "TCU") 9 controls changing of speed and power of an engine output performed by the transmission 12. In accordance with a mode selection command issued by the driver (the position of a select lever operated by the driver), the TCU 9 controls the driving of a drive actuator for driving a transmission mechanism, thereby controlling a gear ratio of the transmission 12. Through this control, the transmission 12 changes the speed and power of the engine output and transmits the resultant output to the driving shaft of the front wheels 14. To accomplish this task, vehicle operating state variables (for example, a vehicle speed) and the like required for controlling the speed and power changing of the engine output performed by the transmission 12 are input to the TCU 9. In addition, data (map), a control program, and the like preset based on the specifications of the transmission 12 are stored in a memory provided in the TCU 9.

A braking device is provided for the front wheels 14 and the rear wheels 15. An antilock braking system (ABS) control unit (hereinafter referred to as an "ACU") 10 controls driving of the braking device. In accordance with a brake requirement command issued by the driver (the amount of brake pedal depression), the ACU 10 controls driving of an actuator for driving the braking mechanism, thereby controlling driving of the braking device. The braking device then generates a braking force corresponding to the brake requirement command without allowing the front wheels 14 and the rear wheels 15 to lock up. To accomplish this task, vehicle operating state variables (for example, speeds of the front wheels 14 and the rear wheels 15) and the like required for controlling the driving of the braking device are input to the ACU 10. In addition, data (map), a control program, and the like preset based on the specifications of the braking device are stored in a memory provided in the ACU 10. A speed sensor 16 provided for each of the front wheels 14 detects the speed of the corresponding front wheel. A speed sensor 16 provided for each of the rear wheels 15 detects the speed of the corresponding rear wheel.

A 4WD control unit (hereinafter referred to as a "4WDCU") 6 controls the driving of the electric motor 5 and the second generator 2. In accordance with a torque requirement command issued by the driver (the amount of accelerator pedal depression), the 4WDCU 6 controls the field current of the electric motor 5 and the field current of the second generator 2, thereby controlling driving of the electric motor 5 and driving of the second generator 2. The second generator 2 then produces an output of power required for driving the electric motor 5 so as to obtain a motor torque corresponding to the torque requirement command. The electric motor 5 then produces an output of the motor torque corresponding to the torque requirement command. To accomplish this task, vehicle operating state variables (for example, the output voltage of the second generator 2) and the like required for controlling the driving of the electric motor 5 and the driving of the second generator 2 are input to the 4WDCU 6. In addition, data (map), a control program, and the like preset based on the specifications of the electric motor 5 and the second generator 2 are stored in memory provided in the 4WDCU 6.

The ECU 8, the TCU 9, the ACU 10, and the 4WDCU 6 are electrically interconnected through an onboard LAN (CAN) bus. This arrangement allows a sensor detected signal applied to another control unit to be indirectly acquired through the onboard LAN bus. The sensor detected signal may of course be acquired directly and parallel; however, the former arrangement would be preferable, considering needs for simplifying an onboard communications system through a reduction in onboard wiring and for a reduced cost. It is also possible to share data calculated by other control units. Dotted line arrows in FIG. 3 represent the flows of control signals. Here, a unidirectional arrow represents an input or output control signal, while bidirectional arrows represent input and output control signals. A solid line arrow represents the flow of power.

Figure 2:
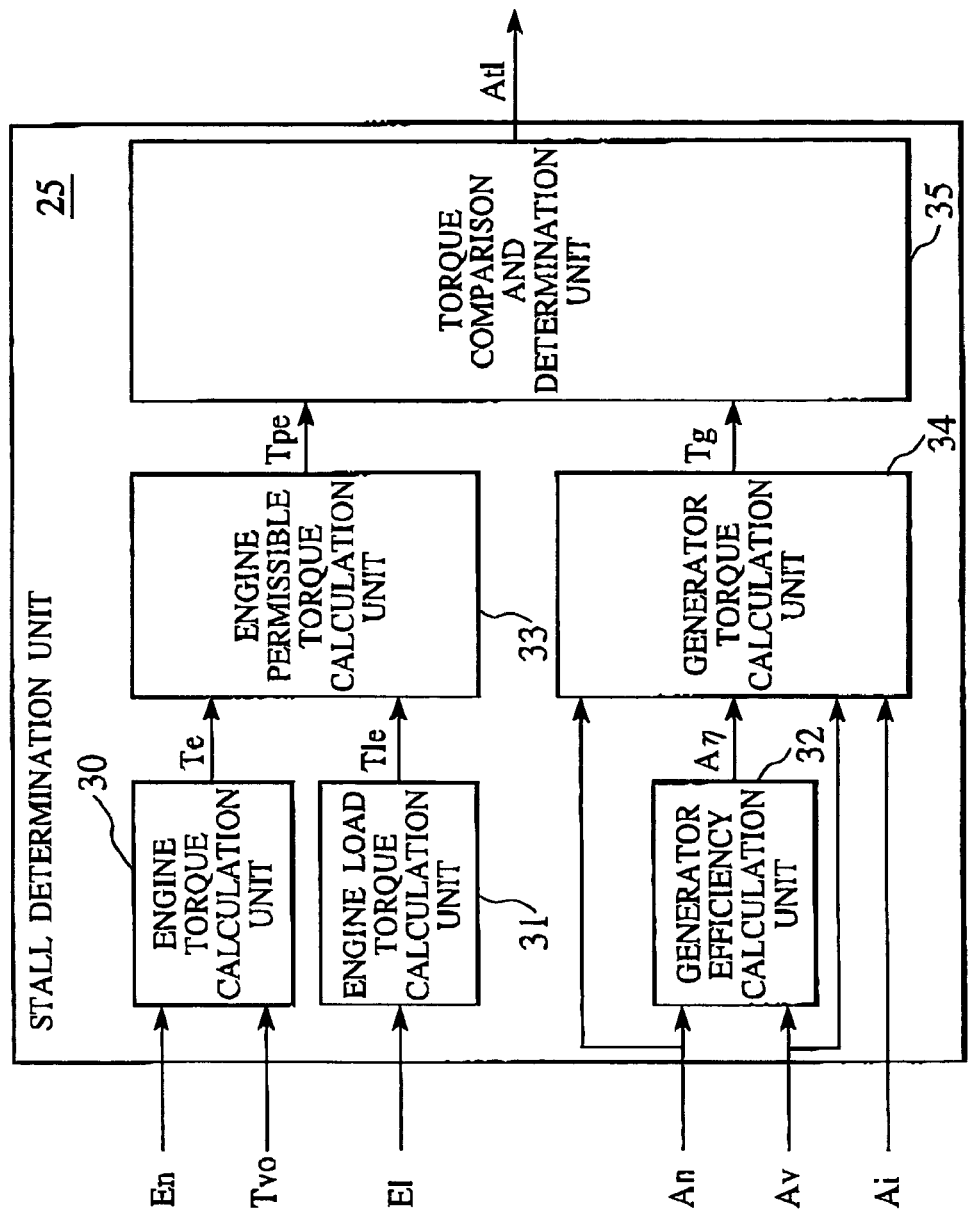
FIG. 2 is a block diagram showing the configuration of a stall determination unit of the four-wheel-drive control unit shown in FIG. 1.
Figure 3:
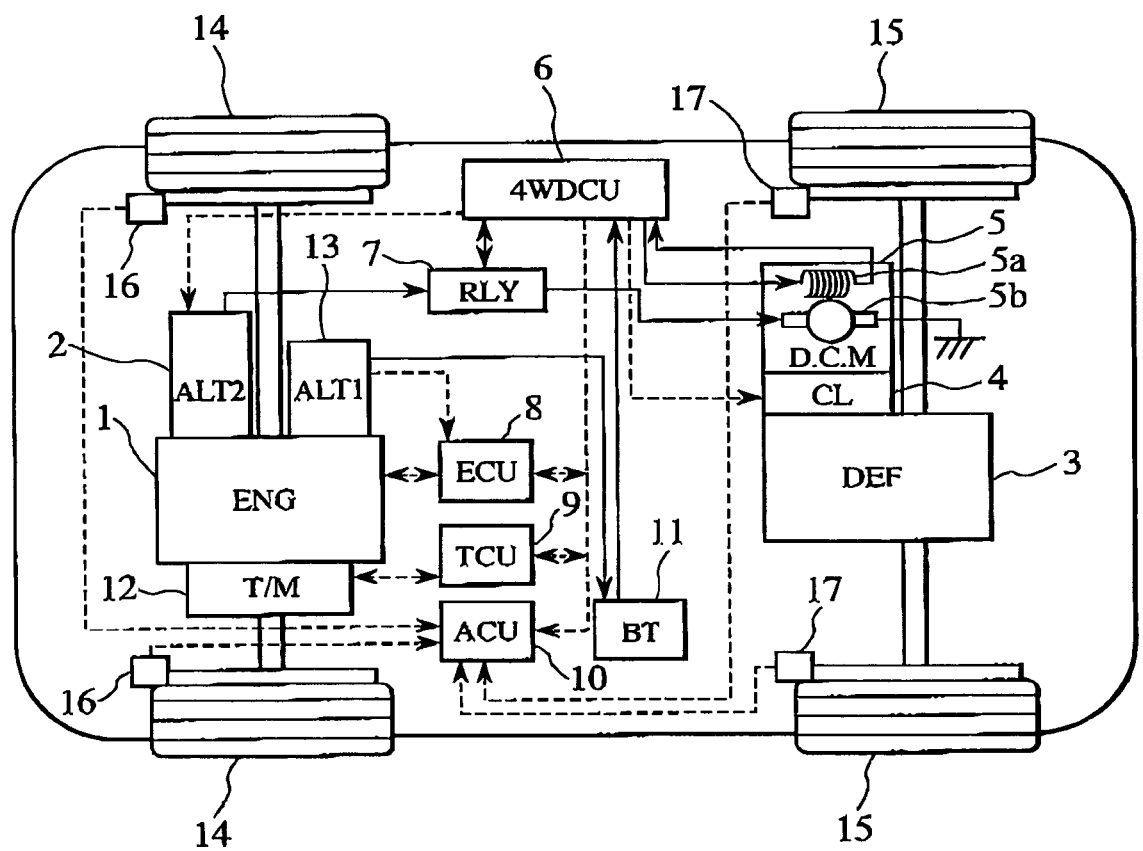
FIG. 3 is a block diagram showing an overall configuration of a driving apparatus for the hybrid car provided with the four-wheel-drive control unit shown in FIG. 1.
Figure 4:
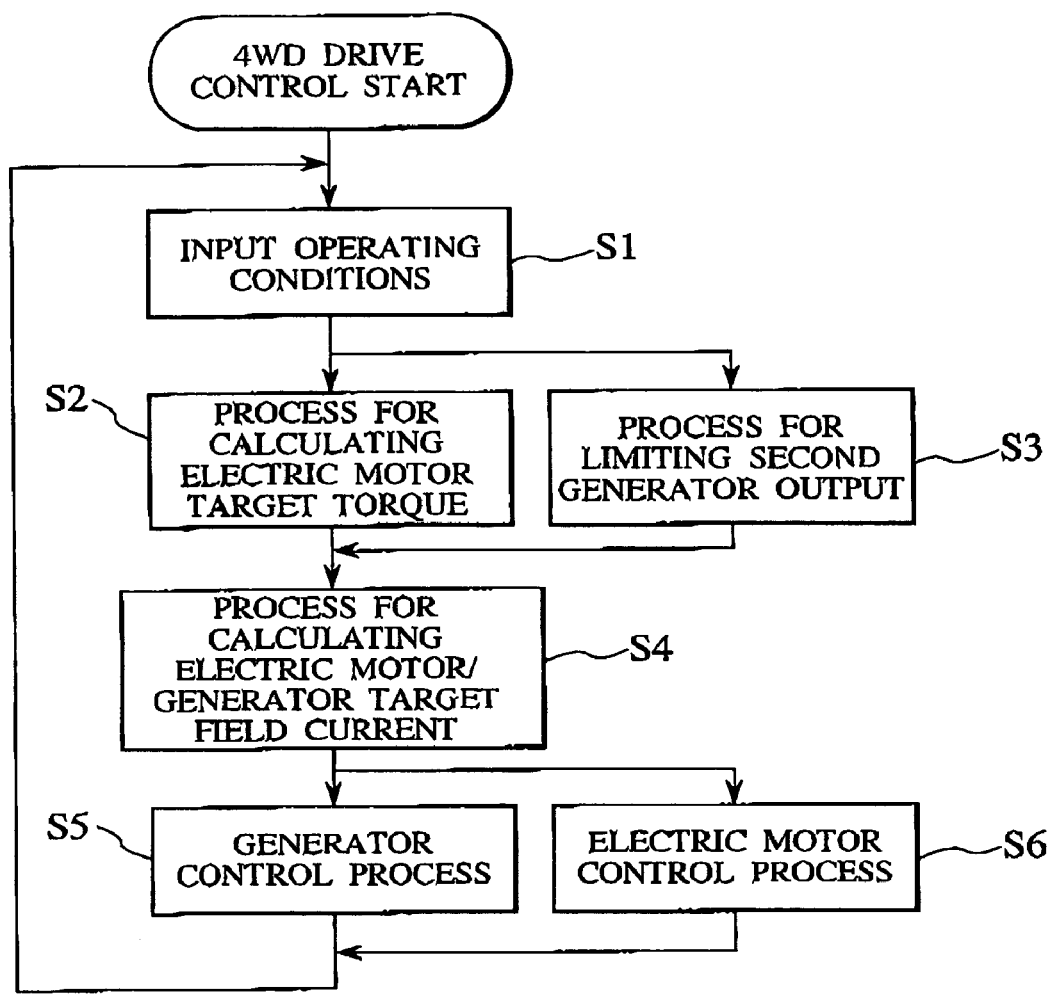
FIG. 4 is a flow chart showing an overall flow of four-wheel-drive control provided by the four-wheel-drive control unit shown in FIG. 1.
Figure 5:
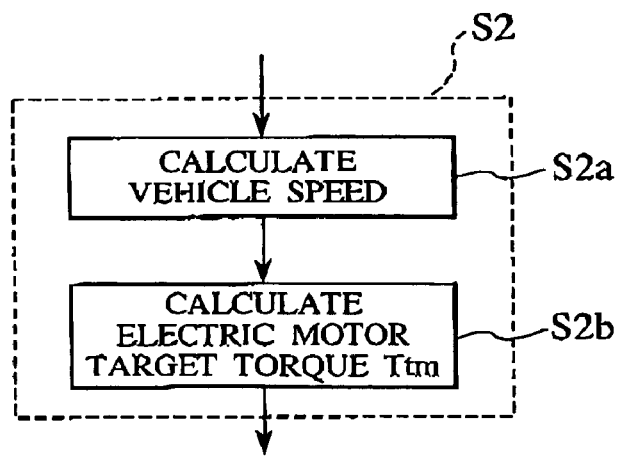
FIG. 5 is a flow chart showing the flow of processing for calculating an electric motor target torque in the four-wheel-drive control shown in FIG. 4.
Figure 6:
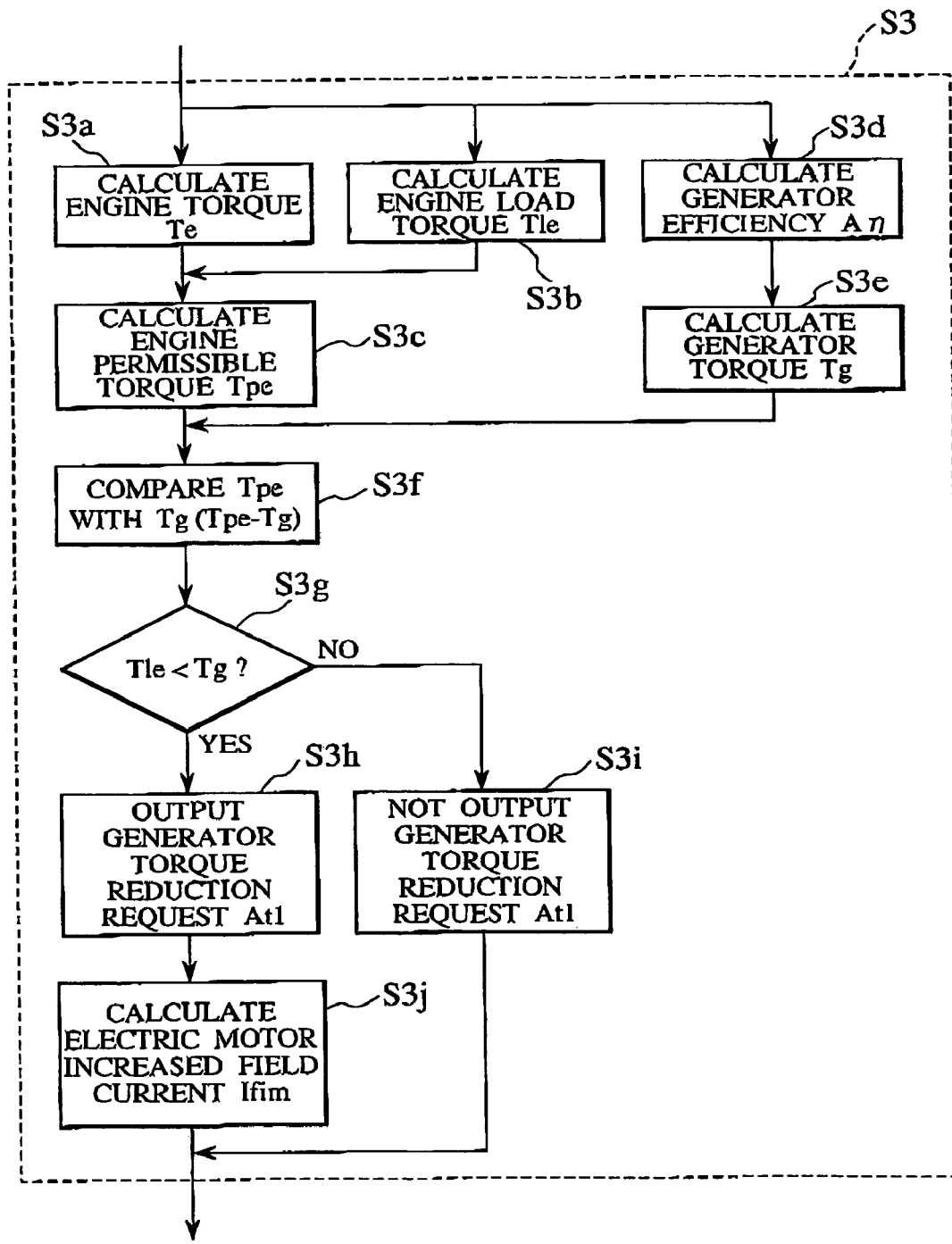
FIG. 6 is a flow chart showing the flow of processing for limiting an output of a second generator in the four-wheel-drive control shown in FIG. 4.
Figure 7:
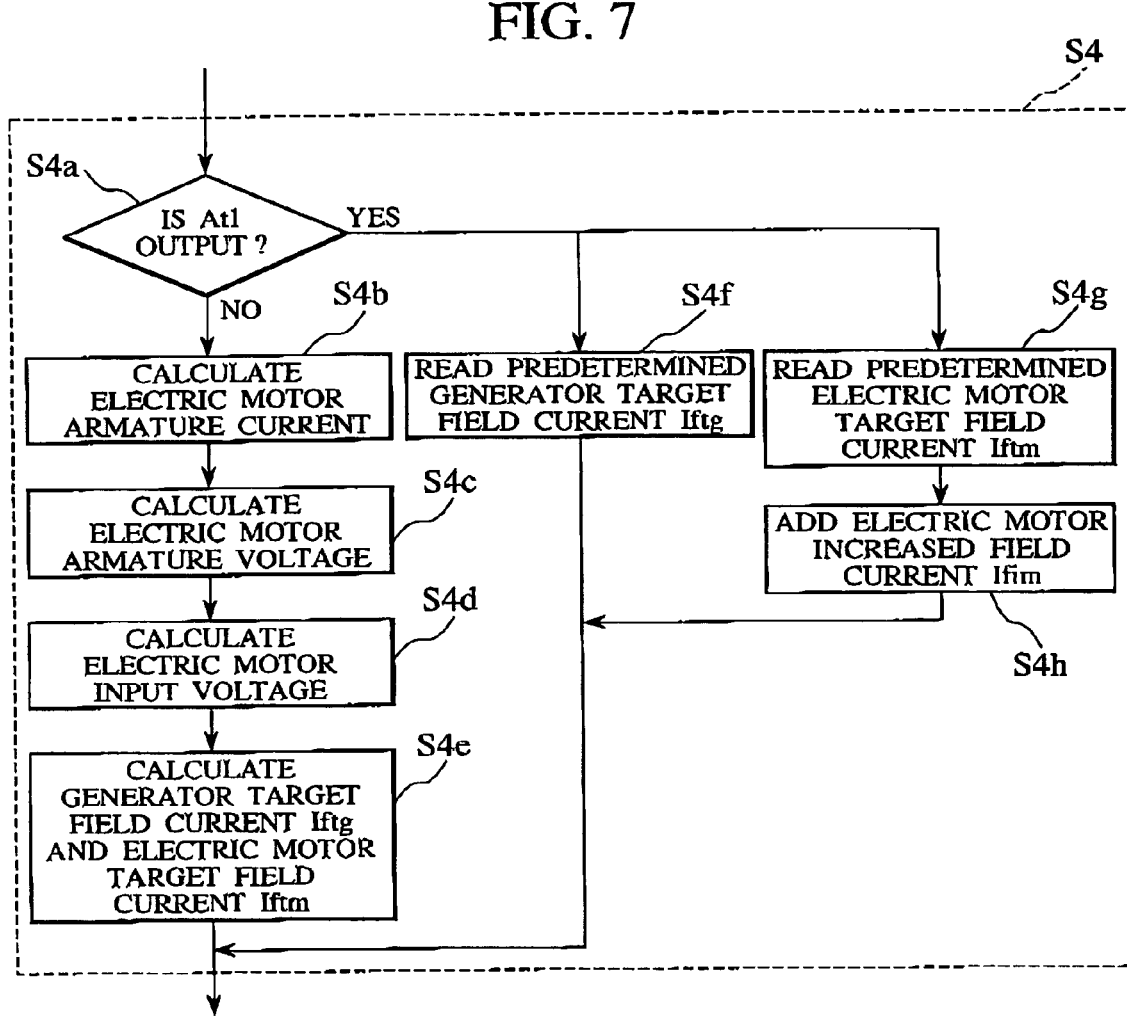
FIG. 7 is a flow chart showing the flow of processing for calculating an electric motor target field current and a generator target field current in the four-wheel-drive control shown in FIG. 4.

FIGS. 1 and 2 show the configuration of the 4WDCU 6. The 4WDCU 6 is provided externally to a main body of the electric motor 5 and that of the second generator 2. The 4WDCU 6 is provided with a central processing unit formed by a microprocessor and an electric motor drive circuit 24. Together with a voltage regulator provided in the main body of the second generator 2 and a control unit for the electric motor drive circuit 24 and the like, the 4WDCU 6 forms a driving control system for the rear wheels 15. In addition, the 4WDCU 6 is also provided with an input/output circuit, a memory, and the like. In the first embodiment of the present invention, the input/output circuit, the memory, and the like are not shown in the figures.

The central processing unit (CPU) is provided with an electric motor target torque calculation unit 20, an electric motor/generator target field current calculation unit 21, a generator control unit 22, and an electric motor control unit 23. The CPU performs calculations required for controlling the driving of the electric motor 5 and the second generator 2. The CPU is also provided with a stall determination unit 25 that is composed of an engine torque calculation unit 30, an engine load torque calculation unit 31, a generator efficiency calculation unit 32, an engine permissible torque calculation unit 33, a generator torque calculation unit 34, and a torque comparison and determination unit 35. It is thereby ensured that a decision can be made as to whether or not the engine 1 is in an overloaded condition and, if it is determined that the engine 1 is in the overloaded condition, the output of the second generator 2 is limited. Furthermore, the CPU is also provided with an electric motor increased field current calculation unit 26. The electric motor increased field current calculation unit 26 increases the field current of the electric motor 5 so as not to allow the output of the electric motor 5 to be reduced even when the output of the second generator 2 is limited because of an overloaded engine 1. Further, the CPU is also provided with a control unit for issuing an ON/OFF command to the clutch 4 and a relay 7, which control unit is not shown in the figures for the first embodiment of the prevent invention.

The control unit for controlling the clutch 4 and the relay 7 engages the clutch 4 and turns ON the relay 7 when a mode selection command (a four-wheel-drive mode command) is issued from a mode selector switch (not shown) provided on the driver's seat side. When the mode selection command is not issued, the control unit disengages the clutch 4 and turns OFF the relay 7. In addition, the control unit for controlling the clutch 4 and the relay 7 engages the clutch 4 and turns ON the relay 7 only when the vehicle runs forward or backward over a range from the start (with the vehicle speed at 0 km/h) to a predetermined vehicle speed level (e.g., 20 km/h). When the vehicle speed exceeds 20 km/h, the control unit disengages the clutch 4 and turns OFF the relay 7. Through these control procedures, fuel economy can be improved, while the four-wheel-drive mechanism can be built more compact and lighter in weight.

FIGS. 4 through 7 depict control operations performed by the 4WDCU 6 according to the first embodiment of the present invention. Data indicating vehicle operating conditions is first input. Specifically, the input data include: a field current Ifm of the electric motor 5; a speed En of the engine 1, an electric machine load condition El; a torque requirement command Tv0 (the amount of accelerator pedal depression or a throttle position of the electronic control throttle provided in the engine 1); an output voltage Av, an output current Ai, and a speed An of the second generator 2; a wheel speed Wfls, Wfrs of the front wheels 14; and a wheel speed Wrls, Wrrs of the rear wheels 15 (step S1).

The torque requirement command Tv0 is directly input from a depression amount detection sensor provided in the accelerator pedal or a throttle position detection sensor provided in the electronic control throttle of the engine 1. The torque requirement command Tv0 may, instead, be input through the ECU 8. The speed En of the engine 1 is directly input from a speed sensor provided in the engine 1, or may, instead, be input through the ECU 8. The wheel speed Wfls, Wfrs of the front wheels 14 and the wheel speed Wrls, Wrrs of the rear wheels 15 are directly input from a speed sensor 16 provided in the front wheels 14 and a speed sensor 17 provided in the rear wheels 15, respectively. The wheel speed may, instead, be input through the ACU 10.

The output voltage Av and the output current Ai of the second generator 2 are directly input from the relay 7 configured so as to be capable of detecting voltage and current. A current sensor and a voltage sensor may, instead, be separately provided to directly input the voltage and current data therefrom. For the speed An of the second generator 2, the result of calculation performed by the ECU 8 based on the speed of the engine 1 is input. The data may, instead, be directly input from the speed sensor provided in the engine 1 and calculated by the 4WDCU 6. Or, the data may be input by way of the ECU 8 and then calculated by the 4WDCU 6. The electric machine load condition El is input through the ECU 8, or may be directly input from a sensor detecting the electric machine load condition.

After the data indicating the vehicle operating conditions have been input, the electric motor target torque calculation unit 20 performs a process for calculating the electric motor target torque (step S2). In parallel with this process, the stall determination unit 25 and the electric motor increased field current calculation unit 26 performs a process for limiting the output of the second generator 2 (step S3).

Figure 8:
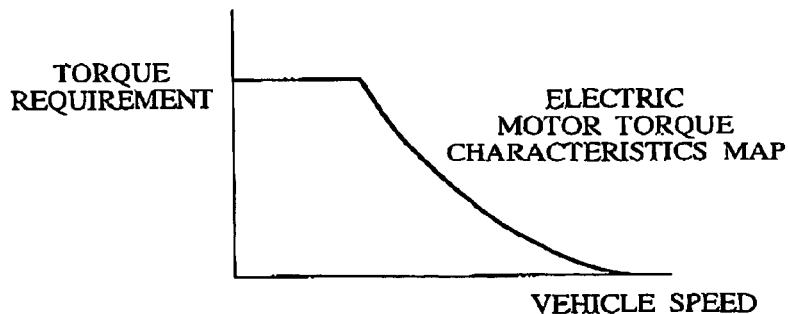
FIG. 8 is a diagram showing a typical electric motor torque characteristic map representing a relation between a torque demand and a vehicle speed, making up part of data stored in a memory of the four-wheel-drive control unit shown in FIG. 1.

The process for calculating the electric motor target torque will be described. The electric motor target torque calculation unit 20 receives inputs of the torque requirement command Tv0, wheel speeds Wfls, Wfrs of the front wheels 14, and wheel speeds Wrls, Wrrs of the rear wheels 15. The electric motor target torque calculation unit 20 calculates the speed (an average speed) of the front wheels 14 based on the wheel speeds Wfls. Wfrs of the front wheels 14 and the speed (an average speed) of the rear wheels 15 based on the wheel speeds Wrls, Wrrs of the rear wheels 15. The vehicle speed is then calculated through the process for selecting the lower speed from among all the wheel speed readings and the like (step S2a). After the vehicle speed has been obtained, an electric motor target torque Ttm corresponding to the vehicle speed calculated in step S2a and the torque requirement command Tv0 is calculated from an electric motor torque characteristics map previously stored in the memory and formed by a relationship between torque requirements and vehicle speeds (step S2b). Through these processes, the electric motor target torque calculation unit 20 produces an output of the electric motor target torque Ttm. FIG. 8 gives a typical electric motor torque characteristics map.

The process for limiting the output of the second generator 2 will be described. The process for limiting the output of the second generator 2 is composed of a process for determining an overloaded condition of the engine 1 performed by the stall determination unit 25, which is followed by a process for calculating the electric motor increased field current. The following two specific processes are performed in the process for determining an overloaded condition of the engine 1. Specifically, the engine torque calculation unit 30, the engine load torque calculation unit 31, and the engine permissible torque calculation unit 33 perform a process for calculating the engine permissible torque; and the generator efficiency calculation unit 32 and the generator torque calculation unit 34 perform a process for calculating the generator torque. These two processes are carried out in parallel with each other.

Figure 9:
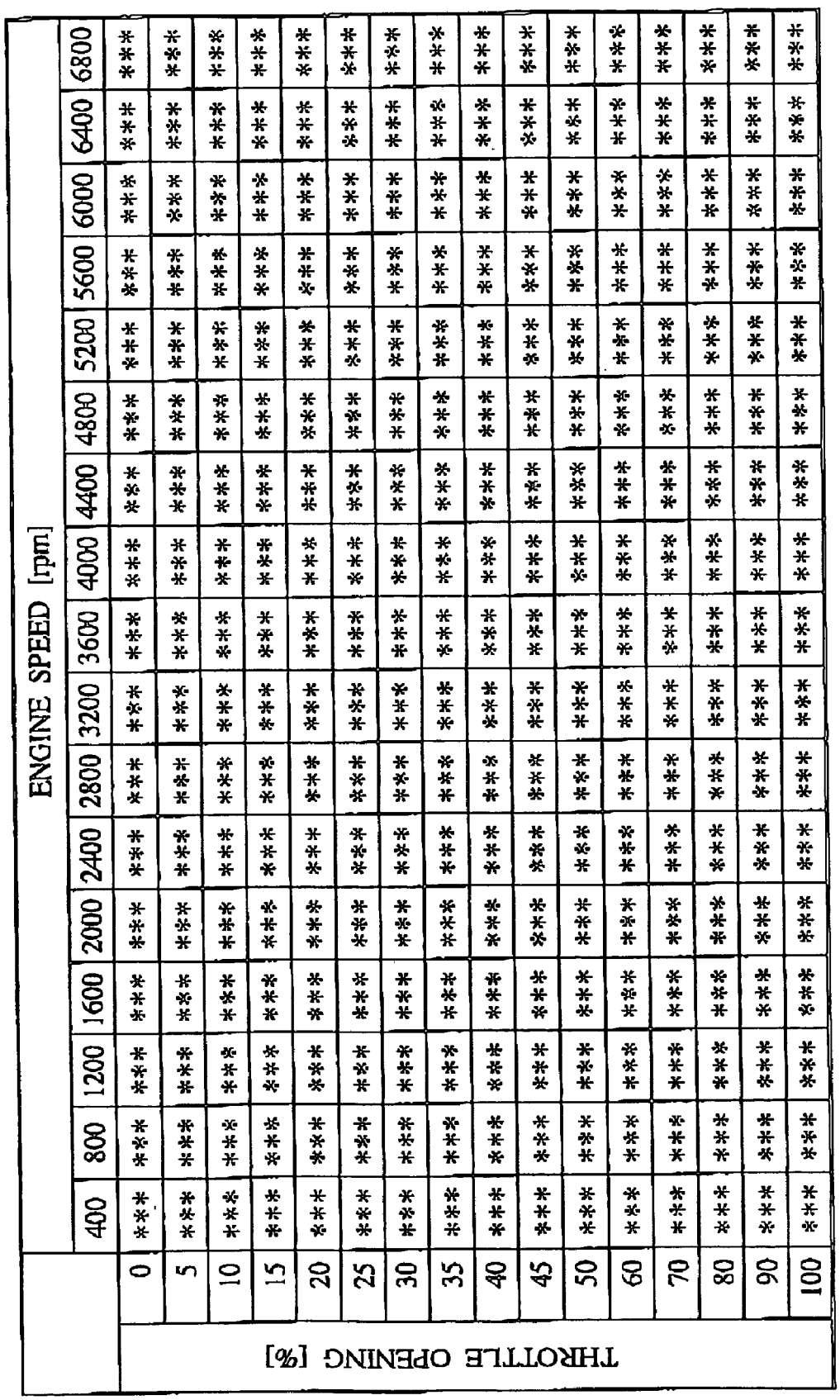
FIG. 9 is a table showing a typical engine torque characteristic map representing a relation between a torque requirement command and an engine speed, making up part of data stored in a memory of the four-wheel-drive control unit shown in FIG. 1.

The process for calculating the engine permissible torque will be first described. The engine torque calculation unit 30 receives inputs of the speed En of the engine 1 and the torque requirement command Tv0. The engine torque calculation unit 30 refers to an engine torque characteristic map previously stored in the memory and formed by a relationship between torque requirement commands and engine speeds and calculates an engine torque Te corresponding to the speed En of the engine 1 and the torque requirement command Tv0 that have been input thereto (stop S3a). The engine torque calculation unit 30 then produces an output of the engine torque Te. FIG. 9 is a table showing a typical engine torque characteristic map.

The engine load torque calculation unit 31 receives an input of the electric machine load condition E1. The engine load torque calculation unit 31 refers to an electric machine load torque characteristics map previously stored in the memory and formed by a relationship between electric machine load torque values and electric machine load conditions (e.g., ON or OFF) determined according to the specifications of the electric machine load. The engine load torque calculation unit 31 thereby calculates an engine load torque Tle (torque of all electric machine loads but the generator torque of the second generator 2) corresponding to the electric load condition that has been input thereto (step S3b). For example, the electric machine load may be an electric motor for driving a compressor of an air-conditioning device. In this case, the engine load torque Tle to be obtained through the calculation process is an output torque of the compressor-driving electric motor when the air-conditioning device is ON (or a total of output torque values of all electric machine loads in operation if any other electric machine load is being operated), as determined from a torque characteristic as determined from the specifications of the compressor-driving electric motor. The engine load torque calculation unit 31 then produces an output of the engine load torque Tle.

The engine permissible torque calculation unit 33 receives inputs of the engine torque Te calculated in step S3a and the engine load torque Tle calculated in step S3b. The engine permissible torque calculation unit 33 calculates an engine permissible torque Tpe using the following equation (step S3c).

$$Tpe=(Te-Tle) \times Kt \times Kp \qquad \text{(Expression 1)}$$

Where, Kt is a characteristic as determined from the specifications of the transmission 12; for example, a transmission coefficient as calculated from a driving force transmission characteristic map of a torque converter. Kp is a ratio of a pulley of the second generator 2 to a pulley of the engine 1 directly connected to the pulley of the second generator 2 using a belt. As such, the engine permissible torque calculation unit 33 produces an output of the engine permissible torque Tpe.

The process for calculating the generator torque will next be described. The generator efficiency calculation unit 32 receives inputs of the output voltage Av and the speed An of the second generator 2. The generator efficiency calculation unit 32 refers to an efficiency characteristics map of the second generator 2 formed by a relationship between generated voltages of the second generator 2 and speeds of the second generator 2. The generator efficiency calculation unit 32 thereby calculates a generator efficiency Aη corresponding to the output voltage Av and the speed An of the second generator 2 that have been input thereto (step S3d). The generator efficiency calculation unit 32 then produces an output of the generator efficiency Aη. FIG. 10 is a typical table showing an efficiency characteristic map of the second generator 2.

The generator torque calculation unit 34 receives inputs of the output current Ai, the output voltage Av, and the speed An of the second generator 2 that have previously been input and the generator efficiency Aη calculated in step S3d. The generator torque calculation unit 34 calculates a generator torque Tg using the following equation (step S3e).

$$Tg=Av \times Ai \times Kg1/(A\eta \times An \times Kg2) \qquad \text{(Expression 2)}$$

Where, Kg1 and Kg2 are generator coefficients calculated based on the generator characteristics as determined from the specifications of the second generator 2. The generator torque calculation unit 34 then produces an output of the generator torque Tg.

The torque comparison and determination unit 35 receives inputs of the engine permissible torque Tpe calculated in step S3d and the generator torque Tg calculated in step S3e. The torque comparison and determination unit 35 compares the engine permissible torque Tpe that has been input with the generator torque Tg that has also been input (Tpe−Tg) (step S3f) and determines if the generator torque Tg has exceeded the engine permissible torque Tpe (step S3g). If step S3g is answered in the affirmative (Tpe−Tg<0), the torque comparison and determination unit 35 outputs a generator torque reduction request Atl (step S3h). If step S3g is answered in the negative (Tpe−Tg>0), on the other hand, the torque comparison and determination unit 35 does not output the generator torque reduction request Atl (step S3i).

If the generator torque reduction request Atl is output in step S3h, the process for calculating the electric motor increased field current is executed. If step S3g is answered in the affirmative, the generator torque reduction request Atl and the electric motor field current Ifm are input to the electric motor increased field current calculation unit 26. On receipt of the input of the generator torque reduction request Atl, the electric motor increased field current calculation unit 26 reads an electric motor target field current Iftm with an output limitation imposed on the second generator 2 that is previously stored in the memory to be described later. The electric motor increased field current calculation unit 26 then calculates the difference between the field current I fm of the electric motor 5 when the generator torque reduction request Atl is input and the electric motor target field current Iftm. The electric motor increased field current calculation unit 26 then sets this difference as an electric motor increased field current I fim (step S3j). The electric motor increased field current calculation unit 26 thereby produces an output of the electric motor increased field current Ifim.

After the process for calculating the electric motor target torque and the process for limiting the output of the second generator 2 have been executed parallel to each to other in step S2 and step S3, respectively, a process for calculating the electric motor/generator target field current is executed (step S4).

The electric motor/generator target field current calculation unit 21 receives an input of the electric motor target torque Ttm calculated in step S2. The generator torque reduction request Atl and the electric motor increased field current I fim calculated in step S3 are also input the electric motor/generator target field current calculation unit 21 if it is determined that the engine is in an overloaded condition. The electric motor/generator target field current calculation unit 21 determines whether or not the generator torque reduction request Atl has been input thereto (step S4a). If it is determined that the generator torque reduction request Atl has not been input, an ordinary four-wheel-drive control is executed. Specifically, under the ordinary four-wheel-drive control, an armature current to be supplied to the armature winding 5b of the electric motor 5 is calculated using a relational expression for a separately excited shunt type DC electric motor (step S4b). Then, an armature voltage to be generated in the armature winding 5b of the electric motor 5 is calculated using the relational expression for the separately excited shunt type DC electric motor based on the wheel speed Wrls, Wrrs of the rear wheels 15 (step S4c). Next, based on the armature current calculated in step S4b and the armature voltage calculated in step S4c, an input voltage to be supplied to the armature winding 5b of the electric motor 5 (the output voltage of the second generator 2) is calculated using the relational expression for the separately excited shunt type DC electric motor (step S4d). Next, a generator target field current Iftg of the second generator 2 and the electric motor target field current Iftm of the electric motor 5 are calculated based on the input voltage calculated in step S4d (step S4e). The electric motor/generator target field current calculation unit 21 thereby produces outputs of the generator target field current Iftg and the electric motor target field current Iftm.

In accordance with the first embodiment of the present invention, the input voltage to be supplied to the armature winding 5b of the electric motor 5 (the output voltage of the second generator 2) is calculated using the relational expression for the separately excited shunt type DC electric motor, on the basis of the electric motor target torque Ttm and the speed of the electric motor 5. Then, using the input voltage thus calculated, the generator target field current Iftg and the electric motor target field current Iftm are calculated. Another approach is nonetheless possible. Specifically, the electric motor target field current Iftm corresponding to the electric motor target torque Ttm is calculated using an electric motor field current characteristic map composed of a relation between electric motor target torque values and electric motor field current values; and, the generator target field current Iftg corresponding to the electric motor target torque Ttm is calculated using a generator field current characteristics map composed of a relation between generator target torque values and generator field current values.

If it is determined that the generator torque reduction request Atl has been input, a four-wheel-drive control that takes into account the output limitation of the second generator 2 is executed. Specifically, in the four-wheel-drive control taking into account the output limitation of the second generator 2, the output of the second generator 2 is limited to a predetermined level. To state it another way, the input voltage to be supplied to the armature winding 5b of the electric motor 5 is limited to a predetermined level. The limited output of the second generator 2 is set as detailed in the following. Specifically, the output is set so that the maximum load torque given to the engine 1 from the second generator 2 is equal to or less than a difference between the maximum load torque given to the engine 1 from all loads but the second generator 2 (that is, all loads driven by the engine, for example, the first generator 13) and the maximum torque of the engine 1. To state it another way, the output is set so that the maximum load torque of the second generator 2 falls within the maximum permissible torque range of the engine 1, of which the second generator 2 is allowed to deprive. For this reason, in the four-wheel-drive control taking into account the output limitation of the second generator 2, the generator target field current Iftg is previously established and stored in the memory so that the output of the second generator 2 (the input voltage to be supplied to the armature winding 5b of the electric motor 5) becomes a predetermined set value. In the four-wheel-drive control taking into account the output limitation of the second generator 2, therefore, the previously determined generator target field current Iftg is read from the memory (step S4f) and output, if it is determined that the generator torque reduction request Atl has been input.

In addition, in the four-wheel-drive control taking into account the output limitation of the second generator 2, the input voltage to be supplied to the armature winding 5b of the electric motor 5 is predetermined as described above. It is therefore possible to previously determine also the input voltage to be supplied to the field winding 5a of the electric motor 5 and store the same in the memory. In the four-wheel-drive control taking into account the output limitation of the second generator 2, therefore, the previously determined electric motor target field current is read from the memory (step S4g), if it is determined that the generator torque reduction request Atl has been input. In the four-wheel-drive control taking into account the output limitation of the second generator 2, however, the output of the second generator 2 is limited. As a result, it is not feasible to obtain a driving force of the electric motor 5 corresponding to the electric motor target torque Ttm. For this reason, the electric motor/generator target field current calculation unit 21 adds the electric motor increased field current Ifim calculated in step S3j to the electric motor field current read in step S4g (step S4h). The resultant current value obtained through this addition is output as the electric motor target field current Iftm.

After the process for calculating the electric motor/generator target field current has been executed in step S4, a process for controlling the second generator 2 (step S5) and a process for controlling the electric motor 5 (step S6) are next executed.

The process for controlling the second generator 2 will be described. The generator control unit 22 receives an input of the generator target field current Iftg calculated in step S4e or the generator target field current Iftg read in step S4f. The generator control unit 22 generates, based on the generator target field current Iftg supplied as the input thereto, a field current command signal Ifcg for the voltage regulator of the second generator 2 and outputs the same thereto. The voltage regulator of the second generator 2 controls the field current flowing through the field winding based on the field current command signal Ifcg. This allows the second generator 2 to generate power of a predetermined voltage to be supplied to the armature winding 5b of the electric motor 5 and supply the power thereto.

The process for controlling the electric motor 5 will be described. The electric motor control unit 23 receives an input of the electric motor target field current Iftm calculated in step S4e or the electric motor target field current Iftm calculated in step S4h. The electric motor control unit 23 generates, based on the electric motor target field current Iftm provided as the input thereto, a field current command signal Ifcm for the electric motor drive circuit 24 and outputs the same thereto. The electric motor drive circuit 24 then performs ON/OFF control on a semiconductor switching device (e.g., a MOS-FET) forming a bridge circuit in accordance with the field current command signal Ifcm. This translates a battery current I b supplied to the electric motor drive circuit 24 to a corresponding value of the electric motor field current Ifm. The resultant electric motor field current Ifm is supplied to the field winding 5a of the electric motor 5.

After the process for controlling the second generator 2 and the process for controlling the electric motor 5 have been executed, it is then determined whether to complete or continue the four-wheel-drive control. The decision to determine whether to complete or continue the four-wheel-drive control is made based on the following two conditions: one whether or not the vehicle speed is a predetermined value (e.g., 20 km/h) or more, and the other whether the mode selector switch is ON or OFF. If the four-wheel-drive control is to be completed, a four-wheel-drive control program is terminated. If the four-wheel-drive control is to be continued, the operation returns to step S1 and the series of operations of the four-wheel-drive program described in the foregoing will be executed. In the first embodiment of the present invention, these processes are not shown in the flow charts.

In accordance with the first embodiment of the present invention, the engine permissible torque Tpe is compared with the generator torque Tg in step S3f. If it is determined through this comparison that the generator torque Tg exceeds the engine permissible torque Tpe (Tpe−Tg<0), the engine 1 is considered to be in an overloaded condition and the generator torque reduction request Atl is output. A different approach is nonetheless possible as detailed in the following. Specifically, if the generator torque Tg coincides with the engine permissible torque Tpe (Tpe−Tg=0), or if the generator torque Tg exceeds a predetermined value that is set slightly smaller than the engine permissible torque Tpe (the generator torque Tg is about to exceed the engine permissible torque Tpe), then it is determined that the engine 1 can run into the overloaded condition and then the generator torque reduction request Atl may be output.

In accordance with the first embodiment of the present invention, when there is no longer an output of the generator torque reduction request Atl in the middle of the four-wheel-drive control process for limiting the output of the second generator 2, that is, if the generator torque Tg remains smaller than the engine permissible torque Tpe (Tpe−Tg>0), the operation is switched to the ordinary four-wheel-drive control. At this time, the four-wheel-drive control taking into account the output limitation of the second generator 2 is continued for a predetermined period of time before the operation is gradually shifted to the ordinary four-wheel-drive control according to the first embodiment of the present invention. This is done to prevent the load of the second generator 2 from being suddenly applied to the engine 1 through the control operations.

Figure 11:
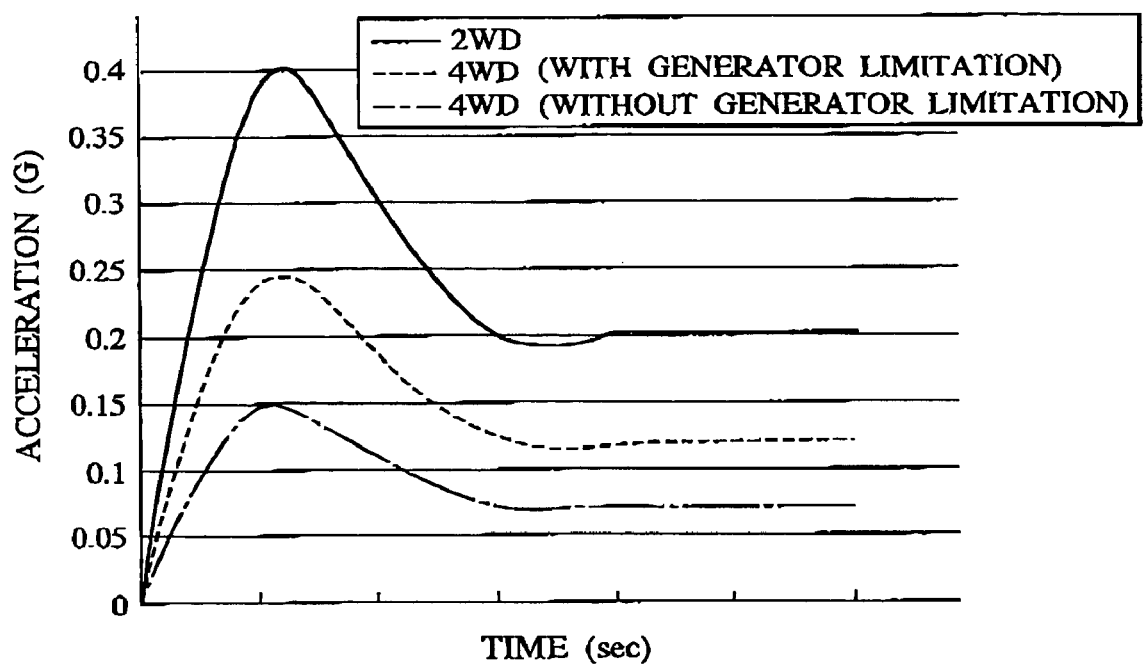
FIG. 11 is a characteristic chart showing effects produced by the four-wheel-drive control unit shown in FIG. 1 and, more specifically, a vehicle acceleration characteristic chart (when an accelerator is fully open) representing a relation between vehicle acceleration and time, comparing the vehicle acceleration in a two-wheel-drive mode (a solid line), the vehicle acceleration in a four-wheel-drive mode (with a limited generator output), and the vehicle acceleration in the four-wheel-drive mode (with the generator output not limited) (a dash-single-dot line)

As described in the foregoing, in accordance with the first embodiment of the present invention, it is determined that the engine 1 is in the overloaded condition if the generator torque Tg exceeds the engine permissible torque Tpe (Tpe−Tg<0), and the generator torque reduction request Atl is output to limit the output of the second generator 2. This allows the load torque given by the second generator 2 to the engine 1 to be limited. It is therefore possible, according to the first embodiment of the present invention, to set the maximum acceleration in the four-wheel-drive mode to 0.35 G relative to the maximum acceleration of 0.4 G in the two-wheel-drive mode when the accelerator is fully open. This is evident from FIG. 11 showing a vehicle acceleration characteristic chart composed of a relation between vehicle acceleration values and time values.

In accordance with the first embodiment of the present invention, therefore, it is possible to bring the maximum acceleration of the four-wheel-drive mode closer to the maximum acceleration of the two-wheel-drive mode (to keep a drop in the maximum acceleration within 0.05 G) than in the four-wheel-drive mode not providing the similar output limitation of the second generator 2 as that provided according to the first embodiment of the present invention. This achieves smooth acceleration in the four-wheel-drive mode, thus improving vehicle acceleration performance in the four-wheel-drive mode. As reference information, the maximum acceleration is 0.3 G in the four-wheel-drive mode not imposing the same output limitation of the second generator 2 as that embodied in the first embodiment of the present invention. During such acceleration, the driver may sense that the vehicle is stalling.

In a vehicle provided with the electronic control throttle on the engine thereof, it is probable that degradation in the vehicle acceleration performance can be avoided since the engine torque can be amplified through control of air-fuel ratio by means of the electronic control throttle. This approach, however, leads to the increase in the amount of fuel consumption. According to the first embodiment of the present invention, however, such a problem can be avoided and fuel economy of the vehicle can be enhanced. The engine 1 could conceivably be replaced with an engine with a greater displacement; however, the approach is not preferable since it involves substantial changes in the vehicle specifications and an increase in the vehicle price.

In accordance with the first embodiment of the present invention, when the generator torque reduction request Atl is output, it invokes calculation of the electric motor increased field current Ifim; the electric motor increased field current Ifim is then added to the previously determined electric motor target field current I ftm; and the field current Ifm flowing through the field winding 5a of the electric motor 5 is increased. Even if the output of the second generator 2 is limited, therefore, reduction in the output of the electric motor 5 (or reduction in the driving force of the rear wheels 15) can be suppressed. According to the first preferred embodiment of the present invention, therefore, it is possible to suppress degradation in the vehicle running performance as a result of four-wheel drive.

Figure 12:
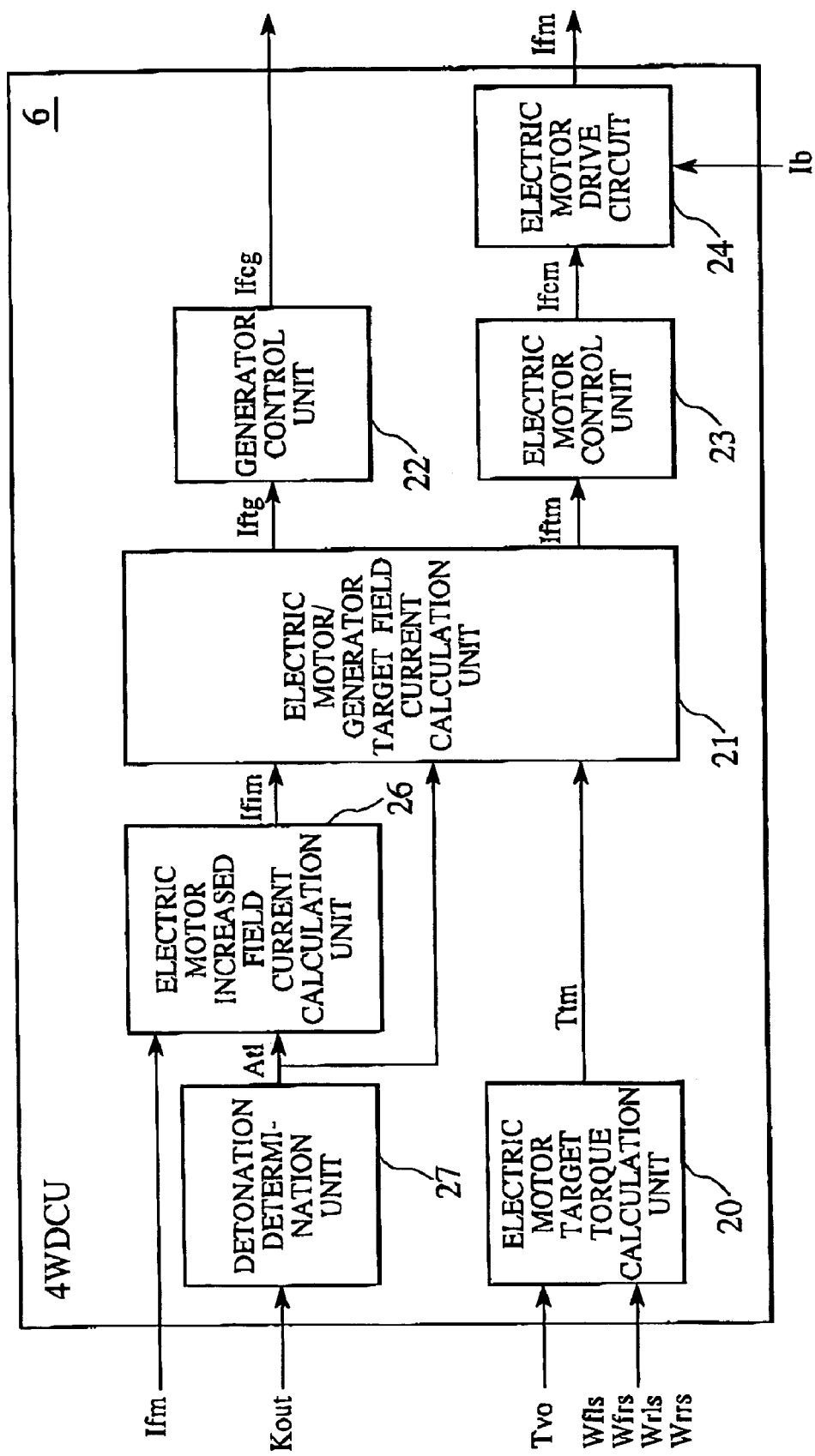
FIG. 12 is a block diagram showing the configuration of a four-wheel-drive control unit for a hybrid car according to a second embodiment of the present invention.
Figure 13:
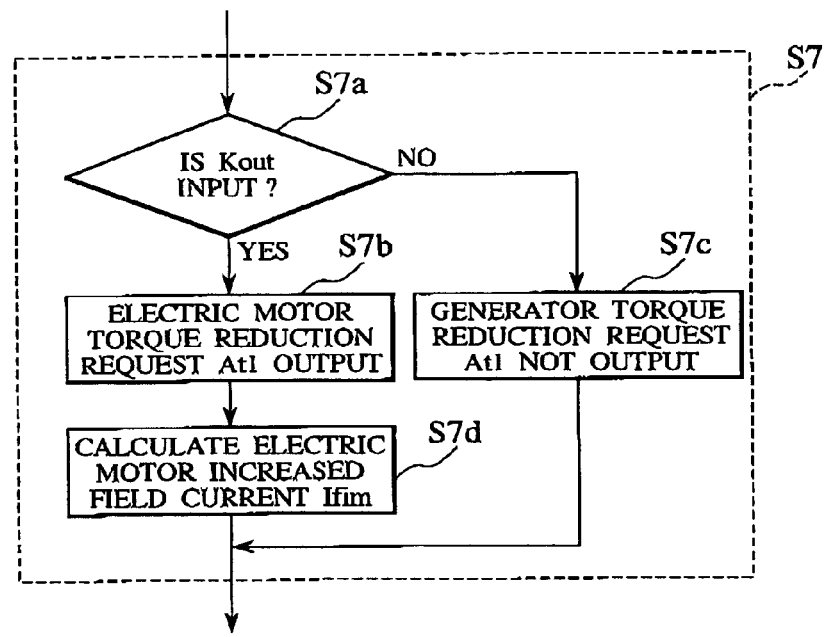
FIG. 13 is a flow chart showing the flow of processing for limiting an output of a second generator in the four-wheel-drive control shown in FIG. 12.

A second preferred embodiment of the present invention will be described with reference to FIGS. 12 and 13. FIG. 12 is a block diagram showing the configuration of the 4WDCU 6 according to this embodiment. FIG. 13 is a flow chart showing the flow of a process for limiting an output of a second generator of the 4WDCU 6 according to this embodiment. The 4WDCU 6 according to the second embodiment is provided with a detonation determination unit 27 instead of the stall determination unit 25 according to the first embodiment. The remaining components are the same as those of the first embodiment and like reference numerals are used to denote similar or corresponding components, and the descriptions of the same are omitted.

The engine 1 is provided with a detonation sensor for detecting abnormal combustion (detonation) arising from an excessive load. An output signal from the detonation sensor is applied to the ECU 8. The ECU 8 determines whether or not abnormal combustion of the engine 1 is encountered based on the signal supplied from the detonation sensor. In accordance with the second embodiment, the output from the second generator 2 is limited when the abnormal combustion occurs in the engine 1. To accomplish this task in accordance with the second embodiment, the ECU 8 provides the 4WDCU 6 with an input of a detonation signal Kout indicating that the abnormal combustion is occurring in the engine 1, should the abnormal combustion occur in the engine 1. Another approach is possible, in which the signal from the detonation sensor is input either directly or by way of the ECU 8, whereby it is determined whether or not the abnormal combustion of the engine 1 occurs.

The four-wheel-drive control operation performed by the 4WDCU 6 in accordance with the second embodiment will be described. The four-wheel-drive control operation according to the second embodiment differs from that according to the first embodiment only in the process for limiting the output of the second generator 2 performed in step S3. Other processes are the same as those in the first embodiment. In the process for limiting the output of the second generator (step S7) in accordance with the second embodiment, only the process for determining the overloaded condition of the engine 1 differs from that according to the first embodiment, the process for calculating the electric motor increased field current being the same as that according to the first embodiment.

If the abnormal combustion occurs in the engine 1, the detonation signal Kout is input in step S1. If no abnormal combustion occurs in the engine 1, the detonation signal Kout is not input. The detonation signal Kout is input to the detonation determination unit 27, if the detonation signal Kout is input in step S1. The detonation determination unit 27 determines whether or not the detonation signal Kout is input (step S7a). If step S7a is answered in the negative, the generator torque reduction request Atl is not output from the detonation determination unit 27 (step S7c) and the ordinary four-wheel-drive control is executed.

If step S7a is answered in the affirmative, on the other hand, the generator torque reduction request Atl is output from the detonation determination unit 27 (step S7b). If the generator torque reduction request Atl is output in step S7b, the electric motor increased field current Ifim is calculated in the electric motor increased field current calculation unit 26 (step S7d). Accordingly, the detonation determination unit 27 outputs the generator torque reduction request Atl and the electric motor increased field current calculation unit 26 outputs the electric motor increased field current Ifim. The four-wheel-drive control for limiting the output of the second generator 2 is thereby executed.

If the signal from the detonation sensor is input either directly or by way of the ECU 8, a decision is made as to whether or not the abnormal combustion of the engine 1 occurs. If it is determined that no abnormal combustion of the engine 1 occurs, the generator torque reduction request Atl is not output. If it is determined that the abnormal combustion of the engine 1 occurs, the generator torque reduction request Atl and the electric motor increased field current Ifim are output.

In accordance with the second embodiment, when there is no longer an output of the generator torque reduction request Atl in the middle of the four-wheel-drive control process for limiting the output of the second generator 2, that is, if the signal from the detonation sensor is no longer input, the operation is switched to the ordinary four-wheel-drive control. At this time, the four-wheel-drive control for limiting the output of the second generator 2 is continued for a predetermined period of time before the operation is gradually shifted to the ordinary four-wheel-drive control according to the second embodiment. This is done to prevent the load of the second generator 2 from being suddenly applied to the engine 1 through the control operations.

As described in the foregoing, in accordance with the second embodiment, the output of the second generator 2 is limited if it is determined that the engine 1 is in the overloaded condition, as in the first embodiment. This allows the load torque given by the second generator 2 to the engine 1 to be limited. It is therefore possible to enhance the vehicle acceleration performance in the four-wheel-drive mode. In addition, in accordance with the second embodiment, when the generator torque reduction request Atl is output, the electric motor increased field current Ifim is calculated to increase the field current Ifm flowing through the field winding 5a of the electric motor 5. This makes it possible to suppress reduction in the output of the electric motor 5 (or reduction in the driving force of the rear wheels 15). This in turn makes it possible to suppress degradation in the vehicle running performance as a result of four-wheel drive.

Figure 14:
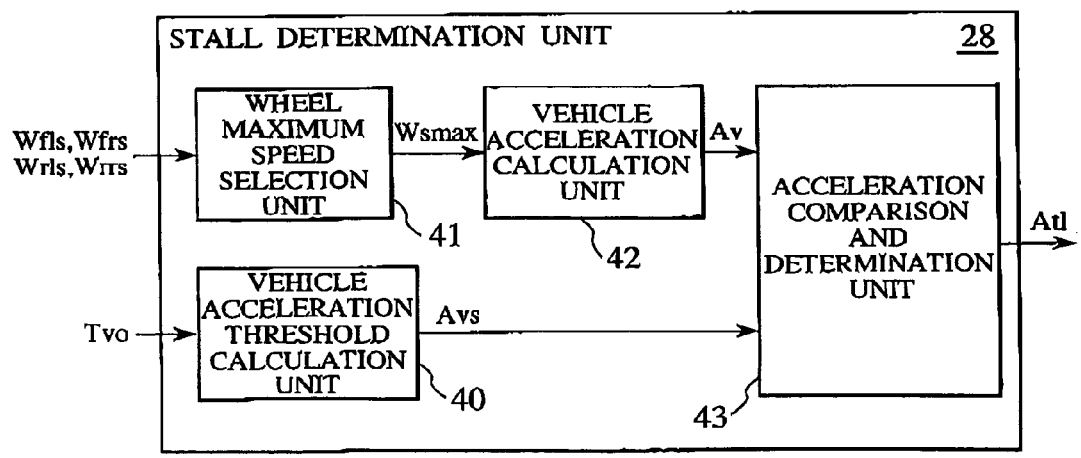
FIG. 14 is a block diagram showing the configuration of a stall determination unit of a four-wheel-drive control unit for a hybrid car according to a third embodiment of the present invention.
Figure 15:
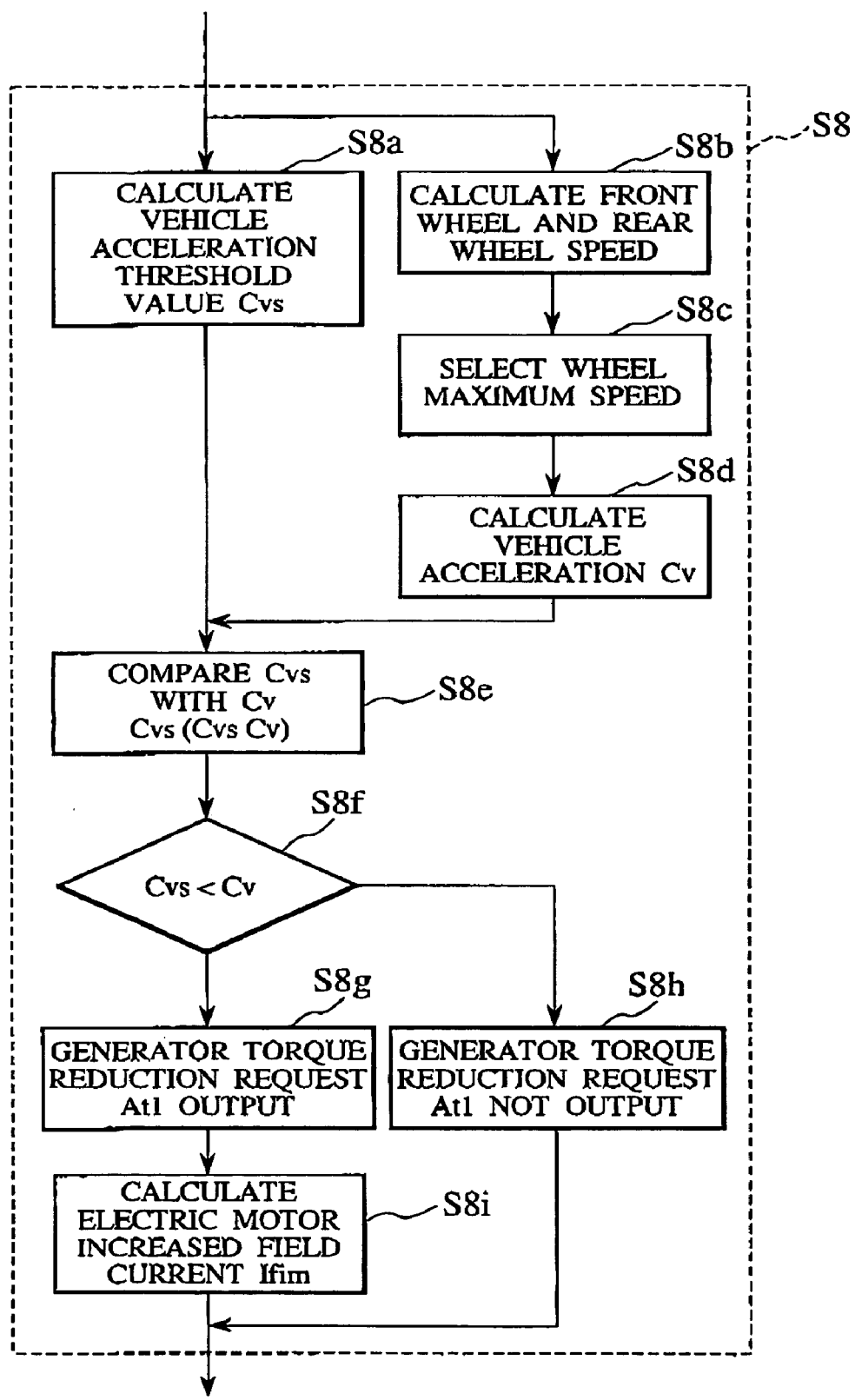
FIG. 15 is a flow chart showing the flow of processing for limiting an output of a second generator in the four-wheel-drive control shown in FIG. 14.
Figure 16:
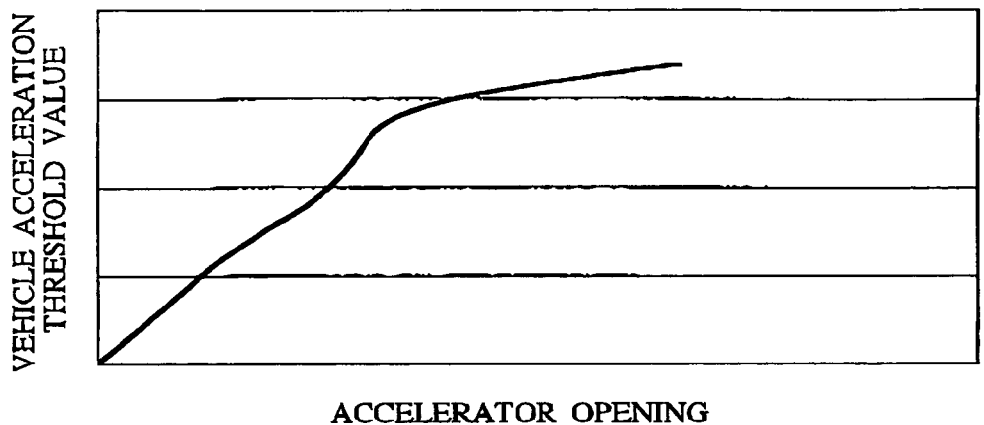
FIG. 16 is a diagram showing a typical characteristics map representing a relation between an accelerator opening and a vehicle acceleration threshold value, making up part of data stored in a memory of the four-wheel-drive control unit shown in FIG. 14.

A third preferred embodiment of the present invention will be described with reference to FIGS. 14 through 16. FIG. 14 is a block diagram showing the configuration of the 4WDCU 6 according to this embodiment. FIG. 15 is a flow chart showing the flow of a process for limiting an output of the second generator of the 4WDCU 6 according to this embodiment. FIG. 16 shows a typical characteristic map representing a relation between an accelerator opening and a vehicle acceleration threshold value. In the 4WDCU 6 according to the third embodiment, the configuration of the stall determination unit differs from that according to the first embodiment. The remaining components are the same as those of the first embodiment and like reference numerals are used to denote similar components, and the descriptions of the same are omitted. A stall determination unit 28 is composed of a vehicle acceleration threshold value calculation unit 40, a wheel maximum speed selection unit 41, a vehicle acceleration calculation unit 42, and an acceleration comparison and determination unit 43.

The four-wheel-drive control operation performed by the 4WDCU 6 in accordance with the third embodiment will be described. The four-wheel-drive control operation according to the third embodiment differs from that according to the first embodiment only in the process for limiting the output of the second generator 2 performed in step S3. Other processes are the same as those in the first embodiment. In the process for limiting the output of the second generator (step S8) in accordance with the third preferred embodiment of the present invention, only the process for determining the overloaded condition of the engine 1 differs from that according to the first embodiment, the process for calculating the electric motor increased field current being the same as that according to the first embodiment.

In step S1, the torque requirement command Tv0, the wheel speed Wfls, Wfrs of the front wheels 14, and the wheel speed Wrls, Wrrs of the rear wheels 15 are input. With these pieces of data input, a process for calculating the vehicle acceleration and a process for calculating the vehicle acceleration threshold value are executed in parallel with each other. In the process for calculating the vehicle acceleration threshold value, the torque requirement command Tv0 is input to the vehicle acceleration threshold value calculation unit 40. The vehicle acceleration threshold value calculation unit 40 uses the characteristic map shown in FIG. 16 and previously stored in the memory to calculate a vehicle acceleration threshold value Cvs corresponding to the torque requirement command Tv0 input thereto (step S8a). The vehicle acceleration threshold value calculation unit 40 thereby produces an output of a vehicle acceleration threshold value Avs.

In the process for calculating the vehicle acceleration, on the other hand, the wheel speed Wfls, Wfrs of the front wheels 14 and the wheel speed Wrls, Wrrs of the rear wheels 15 are input to the wheel maximum speed selection unit 41. The wheel maximum speed selection unit 41 calculates the speed (average speed) of the front wheels 14 based on the wheel speed Wfls, Wfrs of the front wheels 14 input thereto, and the speed (average speed) of the rear wheels 15 based on the wheel speed Wrls, Wrrs of the rear wheels 15 input thereto (step S8b). The wheel maximum speed selection unit 41 then selects, as a wheel maximum speed Wsmax, the maximum speed of all the average speeds obtained through the calculations (step S8c). The wheel maximum speed selection unit 41 thereby produces an output of the wheel maximum speed Wsmax. The wheel maximum speed Wsmax selected in stop S8c is input to the vehicle acceleration calculation unit 42. The vehicle acceleration calculation unit 42 differentiates the wheel maximum speed Wsmax input thereto to calculate a vehicle acceleration Av (step S8d). The vehicle acceleration calculation unit 42 thereby produces an output of a vehicle acceleration Cv.

In the stall determination unit 28, the acceleration comparison and determination unit 43 thereafter executes a process for comparing and determining acceleration. In the process for comparing and determining acceleration, the vehicle acceleration threshold value Cvs calculated in step S8a and the vehicle acceleration Cv calculated in step S8d are input to the acceleration comparison and determination unit 43. The acceleration comparison and determination unit 43 compares the vehicle acceleration threshold value Cvs and the vehicle acceleration Cv input thereto (Cvs−Cv) (step S8e), and determines whether or not the vehicle acceleration Cv exceeds the vehicle acceleration threshold value Cvs (step S8f). If step S8f is answered in the negative (Cvs−Cv>0), the acceleration comparison and determination unit 43 does not produce an output of the generator torque reduction request Atl (step S8h), causing the ordinary four-wheel-drive control to be executed.

If step S8f is answered in the affirmative (Cvs−Cv<0), the acceleration comparison and determination unit 43 produces an output of the generator torque reduction request Atl (step S8g). When the generator torque reduction request Atl is output in step S8f, the electric motor increased field current calculation unit 26 calculates the electric motor increased field current I fim (step S8i) in the same manner as in step S3j according to the first embodiment. Accordingly, the acceleration comparison and determination unit 43 outputs the generator torque reduction request Atl and the electric motor increased field current calculation unit 26 outputs the electric motor increased field current Ifim. The four-wheel-drive control for limiting the output of the second generator 2 is thereby executed.

In accordance with the third embodiment, the vehicle acceleration threshold value Cvs and the vehicle acceleration Cv are compared with each other in step S8e; if it is determined that the vehicle acceleration Cv exceeds the vehicle acceleration threshold value Cvs (Cvs−Cv<0), it is determined that the engine 1 is in the overloaded condition; this results in the generator torque reduction request Atl being output. The following alternative approach is nonetheless possible. Specifically, if the vehicle acceleration threshold value Cvs coincides with the vehicle acceleration Cv (Cvs−Cv=0), or if the vehicle acceleration Cv exceeds a predetermined value that is set slightly smaller than the vehicle acceleration threshold value Cvs (the vehicle acceleration Cv is about to exceed the vehicle acceleration threshold value Cvs), then it is determined that the engine 1 can run into the overloaded condition and then the generator torque reduction request Atl is output.

In accordance with the third embodiment, when there is no longer an output of the generator torque reduction request Atl in the middle of the four-wheel-drive control process for limiting the output of the second generator 2, that is, if the vehicle acceleration Cv does not exceed the vehicle acceleration threshold value Cvs (Cvs−Cv>0), the operation is switched to the ordinary four-wheel-drive control. At this time, the four-wheel-drive control for limiting the output of the second generator 2 is continued for a predetermined period of time before the operation is gradually shifted to the ordinary four-wheel-drive control according to the third embodiment. This is done to prevent the load of the second generator 2 from being suddenly applied to the engine 1 through the control operations.

As described in the foregoing, in accordance with the third embodiment of the present invention, the output of the second generator 2 is limited if it is determined that the engine 1 is in the overloaded condition, as in the first embodiment of the present invention. This allows the load torque given by the second generator 2 to the engine 1 to be limited. It is therefore possible to enhance the vehicle acceleration performance in the four-wheel-drive mode. In addition, in accordance with the third embodiment, when the generator torque reduction request Atl is output, the electric motor increased field current Ifim is calculated to increase the field current Ifm flowing through the field winding 5a of the electric motor 5. This makes it possible to suppress reduction in the output of the electric motor 5 (or reduction in the driving force of the rear wheels 15). This in turn makes it possible to suppress degradation in the vehicle running performance as a result of four-wheel drive.

Figure 17:
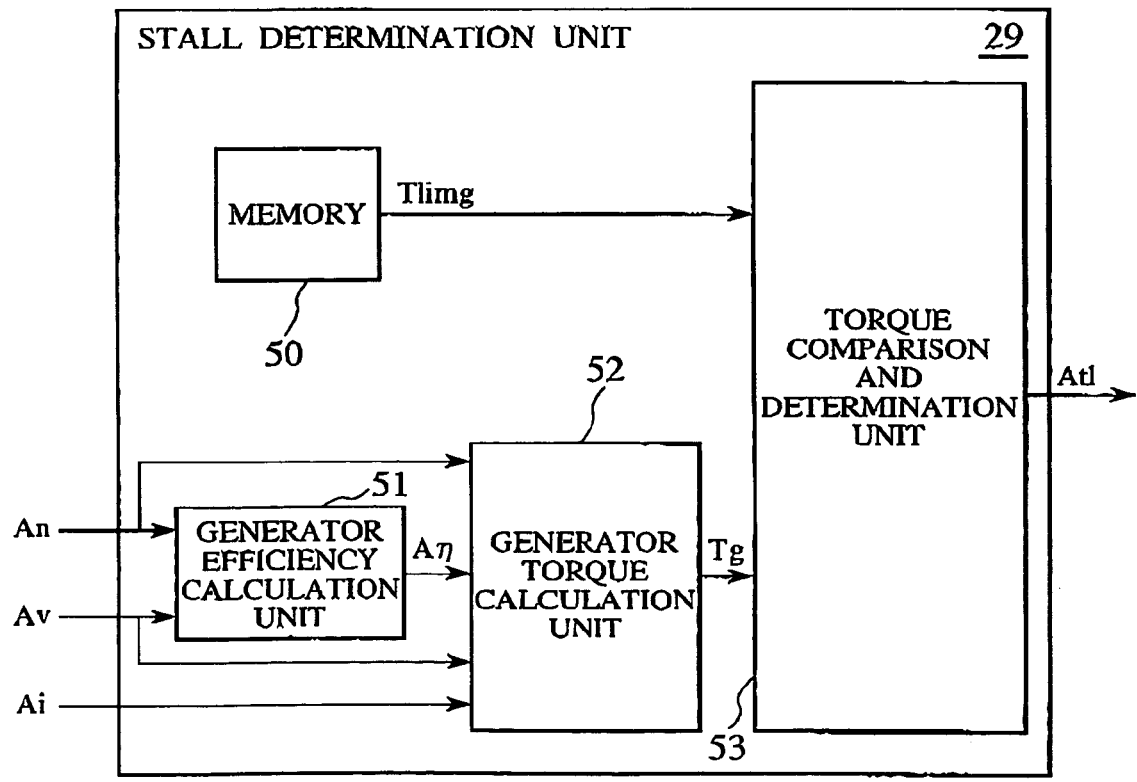
FIG. 17 is a block diagram showing the configuration of a stall determination unit of a four-wheel-drive control unit for a hybrid car according to a fourth embodiment of the present invention.
Figure 18:
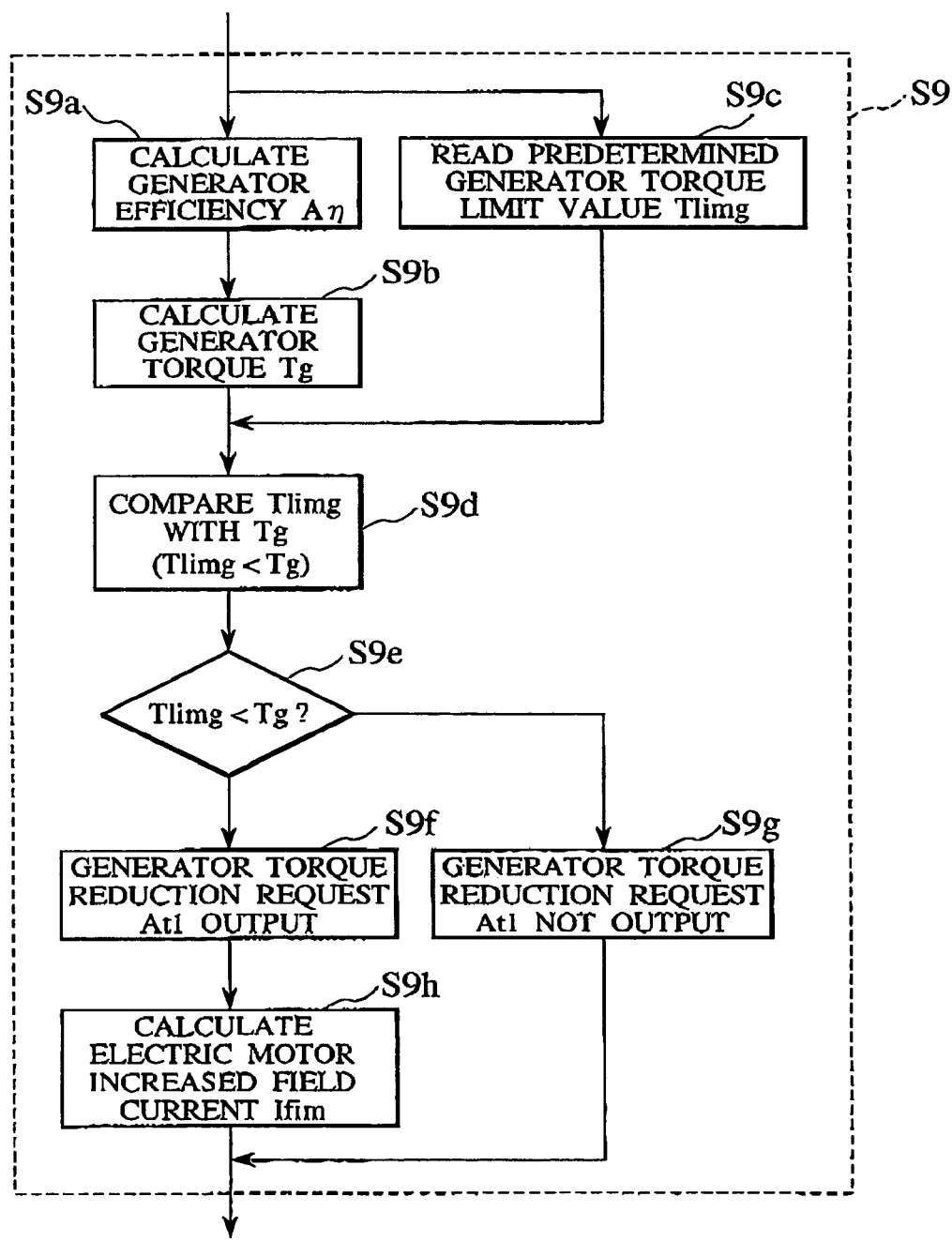
FIG. 18 is a flow chart showing the flow of processing for limiting an output of a second generator in the four-wheel-drive control shown in FIG. 17.

A fourth preferred embodiment of the present invention will be described with reference to FIGS. 17 and 18. FIG. 17 is a block diagram showing the configuration of a 4WDCU 6 according to this embodiment. FIG. 18 is a flow chart showing the flow of a process for limiting an output of a second generator of the 4WDCU 6 according to this embodiment. In the 4WDCU 6 according to the embodiment, the configuration of a stall determination unit differs from that according to the first embodiment. The remaining components are the same as those of the first embodiment and like reference numerals are used to denote like components and the descriptions thereof are limited. A stall determination unit 29 is provided with a memory 50, a generator efficiency calculation unit 51, a generator torque calculation unit 52, and a torque comparison and determination unit 53. The generator efficiency calculation unit 51 is provided with the same function as the generator efficiency calculation unit 32 according to the first embodiment. The generator torque calculation unit 52 has the same function as the generator torque calculation unit 34 according to the first embodiment.

The four-wheel-drive control operation performed by the 4WDCU 6 in accordance with the fourth embodiment will be described. The four-wheel-drive control operation according to the fourth embodiment differs from that according to the first embodiment only in the process for limiting the output of the second generator 2 performed in step S3. Other processes are the same as those in the first embodiment. In the process for limiting the output of the second generator (step S9) in accordance with the fourth embodiment, only the process for determining the overloaded condition of the engine 1 differs from that according to the first embodiment, the process for calculating the electric motor increased field current being the same as that according to the first embodiment.

When the output voltage Av, the output current Ai, and the speed An of the second generator 2 are input in step S1, a process for calculating the generator torque and a process for reading a generator torque limit value are executed in parallel with each other. In the process for calculating the generator torque, the output voltage Av and the speed An of the second generator 2 input in step S1 are input to the generator efficiency calculation unit 51. In the same manner as in step S3d according to the first embodiment of the present invention, the generator efficiency calculation unit 51 calculates the generator efficiency Aη based on the output voltage Av and the speed An of the second generator 2 that have been input thereto (step S9*a*). The generator efficiency calculation unit 51 thereby produces an output of the generator efficiency Aη.

Thereafter, the generator efficiency Aη calculated in step S9*a* and the output voltage Av, the output current Ai, and the speed An of the second generator 2 that are input in step S1 are input to the generator torque calculation unit 52. In the same manner as in step S3*e* according to the first embodiment, the generator torque calculation unit 52 calculates the generator torque Tg, using Expression 2, based on the output voltage Av, the output current Ai, and the speed An of the second generator 2, and the generator efficiency Aη that have been input thereto (step S9*b*). The generator torque calculation unit 52 thereby produces an output of the generator torque Tg.

In the process for reading the generator torque limit value, on the other hand, a generator torque limit value Tlimg is read from the memory 50 (step S9*c*). The generator torque limit value Tlimg is calculated as follows: Specifically, the maximum engine torque when the vehicle is started is calculated from the maximum engine torque determined based on the specifications of the engine 1. The maximum engine torque value at the vehicle start is then multiplied by a characteristic as determined from the specifications of the transmission 12, for example, the transmission coefficient as calculated from the driving force transmission characteristic map of the torque converter and the ratio of the pulley of the second generator 2 to the pulley of the engine 1 directly connected to the pulley of the second generator 2 using the belt. This maximum engine torque value is calculated in advance and stored in the memory 50. The generator torque limit value Tlimg read from the memory 50 in step S9*c* is input to the torque comparison and determination unit 53.

The torque comparison and determination unit 53 next performs a process for torque comparison and determination. In the process for torque comparison and determination, the torque comparison and determination unit 53 receives inputs of the generator torque Tg calculated in step S9*b* and the generator torque limit value Tlimg read in step S9*c*. The torque comparison and determination unit 53 compares the generator torque limit value Tlimg that has been input thereto with the generator torque Tg that has also been input thereto (Tlimg−Tg) (step S9*d*) and determines if the generator torque Tg has exceeded the generator torque limit value Tlimg (step S9*e*). If step S3*g* is answered in the negative (Tlimg−Tg>0), the torque comparison and determination unit 53 does not output the generator torque reduction request Atl (step S9*g*) and the ordinary four-wheel-drive control is executed.

If step S9*e* is answered in the affirmative (Tlimg−Tg<0), on the other hand, the torque comparison and determination unit 53 outputs the generator torque reduction request Atl (step S9*f*). When the generator torque reduction request Atl is output in step S9*f*, the electric motor increased field current calculation unit 26 calculates the electric motor increased field current Ifim (step S9*h*), in the same manner as in step S3*j* according to the first embodiment. Through these procedures, the torque comparison and determination unit 53 produces an output of the generator torque reduction request Atl and the electric motor increased field current calculation unit 26 produces an output of the electric motor increased field current Ifim. The four-wheel-drive control for limiting the output of the second generator 2 is thus executed.

In accordance with the fourth embodiment, the generator torque limit value Tlimg is compared with the generator torque Tg in step S9*d*; if it is then determined that the generator torque Tg exceeds the generator torque limit value Tlimg (Tlimg−Tg<0), it is determined that the engine 1 is in the overloaded condition and the generator torque reduction request Atl Is output. The following alternative decision-making approach may nonetheless be taken. Specifically, if the generator torque limit value Tlimg coincides with the generator torque Tg (Tlimg−Tg=0), or if the generator torque Tg exceeds a predetermined value that is set slightly smaller than the generator torque limit value Tlimg (the generator torque Tg is about to exceed the generator torque limit value Tlimg), then it is determined that the engine 1 can run into the overloaded condition and then the generator torque reduction request Atl is output.

In accordance with the fourth embodiment of the present invention, when there is no longer an output of the generator torque reduction request Atl in the middle of the four-wheel-drive control process for limiting the output of the second generator 2, that is, if the generator torque Tg does not exceed the generator torque limit value Tlimg (Tlimg−Tg>0), the operation is switched to the ordinary four-wheel-drive control. At this time, the four-wheel-drive control for limiting the output of the second generator 2 is continued for a predetermined period of time before the operation is gradually shifted to the ordinary four-wheel-drive control according to the fourth embodiment. This is done to prevent the load of the second generator 2 from being suddenly applied to the engine 1 through the control operations.

As described in the foregoing, in accordance with the fourth embodiment, the output of the second generator 2 is limited if it is determined that the engine 1 is in the overloaded condition, as in the first embodiment. This allows the load torque given by the second generator 2 to the engine 1 to be limited. It is therefore possible to enhance the vehicle acceleration performance in the four-wheel-drive mode according to the fourth embodiment. In addition, in accordance with the fourth embodiment, when the generator torque reduction request Atl is output, the electric motor increased field current Ifim is calculated to increase the field current Ifm flowing through the field winding 5*a* of the electric motor 5. This makes it possible to suppress reduction in the output of the electric motor 5 (or reduction in the driving force of the rear wheels 15). This in turn makes it possible to suppress degradation in the vehicle running performance as a result of four-wheel drive.

Figure 19:
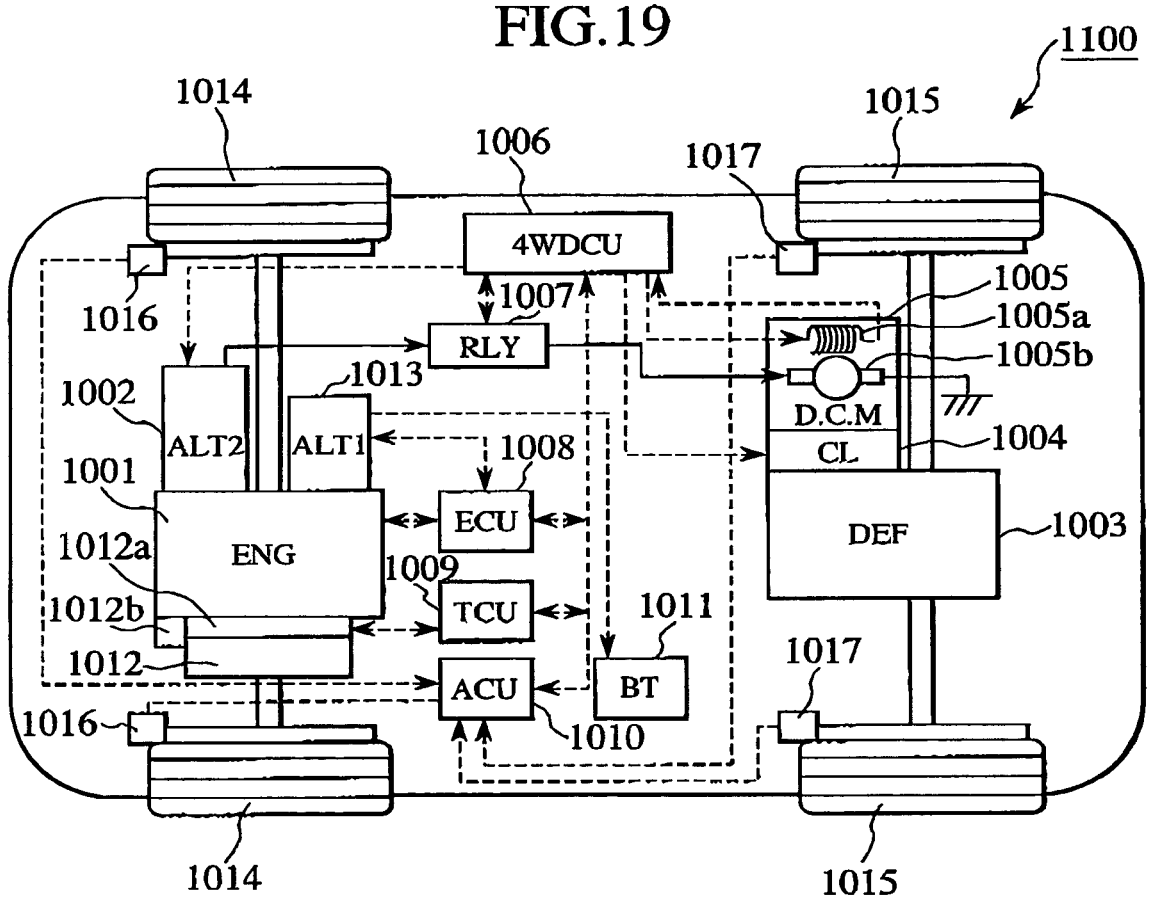
FIG. 19 is a construction diagram showing a typical configuration of a hybrid four-wheel-drive car.

FIG. 19 shows a configuration of a hybrid four-wheel-drive car 1100 according to a fifth embodiment of the present invention. For the sake of simplified explanation, drive wheels driven by an engine 1001 are front wheels 1014 and drive wheels driven by a motor 1005 are rear wheels 1015. The drive wheels driven by the engine and the motor may nonetheless be inverted in practical applications.

The hybrid four-wheel-drive car 1100 according to the fifth embodiment of the present invention is provided with the engine 1001 and the motor 1005. A driving force from the engine 1001 is transmitted to the front wheels by way of a transmission 1012. The transmission 1012 having a built-in clutch 1012*a*, which disengages a mechanical linkage between the engine 1001 and the transmission 1012, that is, connects and disconnects the driving force, selects one gear ratio from among a plurality of gear ratios. The clutch 1012*a* is operated by a driver of the car, disengaged when the driver depresses a clutch pedal not shown. An accelerator pedal sensor (not shown) detects that an accelerator pedal is depressed and the amount of the accelerator pedal depression. A clutch position detecting device (a clutch position sensor, not shown) that monitors a depression force of a clutch plate, detects the position of the clutch 1012a, whether engaged or disengaged. A gear ratio detecting device (a gear ratio sensor, not shown) mounted in the transmission detects a specific gear ratio or a neutral position selected by the transmission 1012 and transmits the information on the gear position selected by the transmission 1012 to a transmission controller 1009. The transmission controller 1009 sets the gear ratio and directs an engaging or disengaging operation of the clutch 1012a. The driving force of the motor 1005 is transmitted to the rear wheels 1015 by way of a clutch 1004 and a differential gear 1003.

An engine controller 1008 opens or closes an electronic control throttle not shown to adjust the output of the engine 1001. A throttle opening sensor provided in the electronic control throttle detects the opening of the electronic control throttle, feeding the information on the throttle position back to the engine controller 1008. An engine speed sensor mounted in the engine 1001 and a detonation sensor detecting a high load on the engine 1001 detect a speed and detonation of the engine 1001, respectively. The engine controller 1008 also reads a signal sent from the accelerator pedal sensor that detects the amount of accelerator pedal depression applied by the driver.

The engine controller 1008 also monitors the state of power generation carried out by an auxiliary generator 1013 (12 V) that serves as an ordinary charging and power generation system. The engine controller 1008 thereby detects an electric load condition of auxiliaries such as a lamp, an air conditioner, and the like. In addition, there is provided a device that detects or estimates torque generated by a generator 1002.

In addition to the auxiliary generator 1013, the generator 1002 driven by the engine 1001 is also disposed for the engine 1001. A 4WD controller 1006 that adjusts a field current flowing through a field coil of the generator 1002 controls the amount of electric power generated by the generator 1002. Since the generator 1002 and the motor 1005 are electrically connected to each other, the 4WD controller 1006 controls torque of the motor 1005, or a driving torque of the rear wheels 1015 driven by the motor 1005.

The front wheels 1014 and the rear wheels 1015 are mounted with a wheel speed sensor 1016 and a wheel speed sensor 1017, respectively. An antilock braking system (hereinafter referred to as the "ABS") controller 1010 is therefore able to detect the wheel speed of each of the front and rear wheels.

Each of the engine controller 1008, the ABS controller 1010, the transmission controller 1009, and the 4WD controller 1006 is connected to each other, allowing data to be transmitted to and from each of these controllers.

A relay 1007 is disposed between the generator 1002 and the motor 1005, allowing electricity to be supplied to the motor 1005 or shutting down electricity supplied thereto. In addition, the relay 1007 is controlled by the 4WD controller 1006. The relay 1007, on the other hand, allows the 4WD controller 1006 to detect current and voltage values to permit detection of the amount of electric power generated by the generator 1002.

Figure 20:
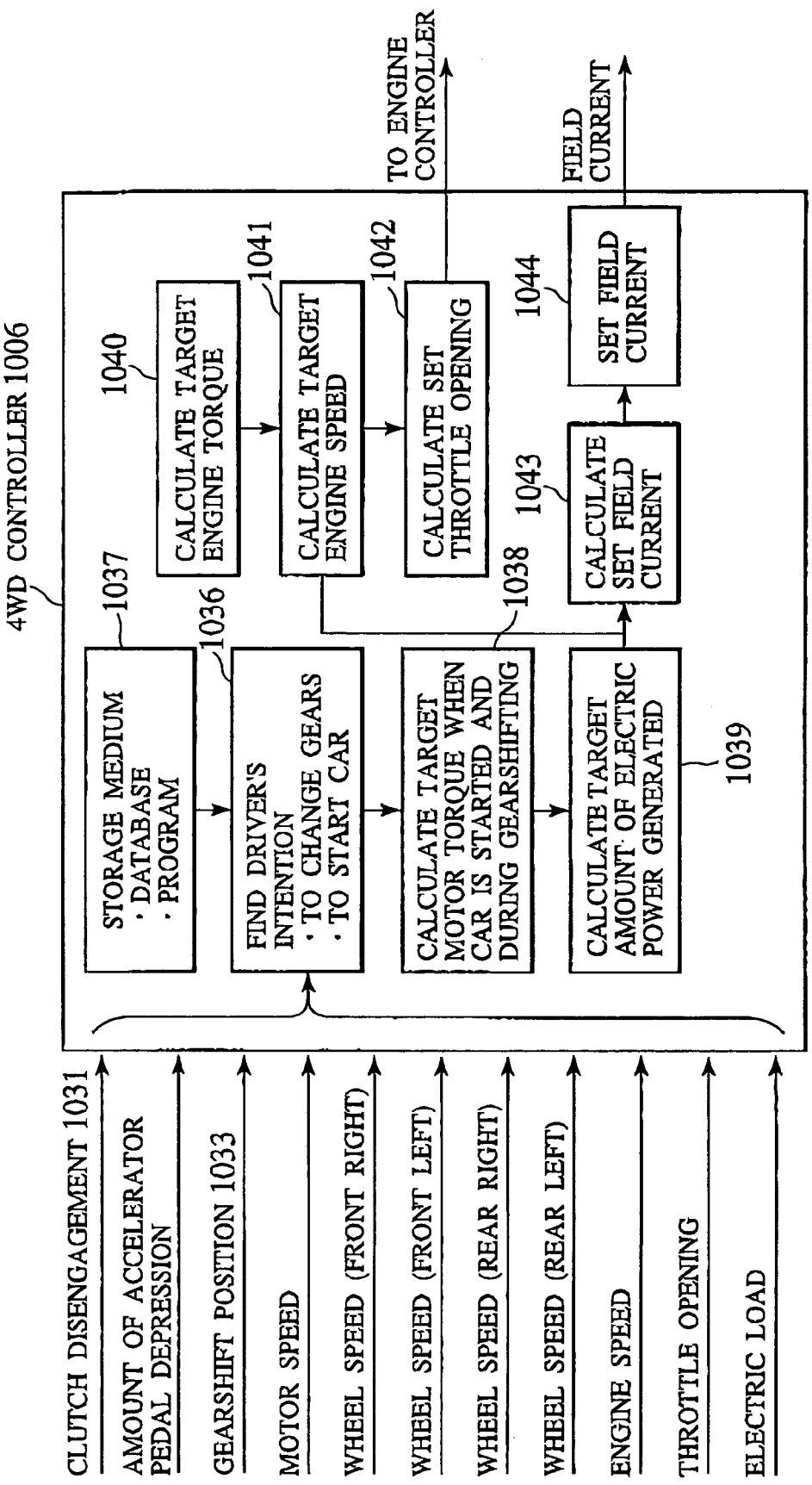
FIG. 20 is a diagram showing details of processing performed by a processing unit.

FIG. 20 shows specific details of processing performed by the 4WD controller 1006 based on the information received from the engine controller 1008, the ABS controller 1010, and the transmission controller 1009. The 4WD controller 1006 receives inputs of signals that represent various types of measured data. The measured data include a disengaged clutch, the amount of accelerator pedal depression, a gearshift position of the transmission, a motor speed, a wheel speed of each of the four wheels the engine speed, the throttle opening, the electric load, the generated voltage, the generated current, and a generator speed. The intention of the driver is determined, as will be described later, based on a clutch disengagement signal 1031, an accelerator pedal depression signal 1032 and a transmission gearshift position signal 1033, and wheel speed signals (other signals may be added). The driver's intention may, for example, be the intention to start the car or the intention to change the gear position. Data and programs of various kinds stored in a storage medium 1037 are used to make a decision on the driver's intention. As described above, the driver's intention can be determined based on the clutch disengagement signal 1031, the accelerator pedal depression signal 1032 and the transmission gearshift position signal 1033, and the wheel speed signals, If it is determined that the driver has the intention to start the car or change the gear position, and not to disengage the clutch, through the decision-making made on the driver's intention, a calculation of a target motor torque 1038 within or during a clutch disengagement period is performed using the accelerator pedal depression signal 1032 and the transmission gearshift position signal 1033. Based on the target motor torque, a calculation of a target amount of electric power generated 1039, a calculation of a target engine torque 1040, a calculation of a target engine speed 1041, a setting of a throttle opening 1042, and a calculation 1043 of, and a setting 1044 of, a field current are performed, as will be described later. A signal indicating the set throttle opening is output to the engine controller 1008 and a signal indicating the set field current is output from the 4WD controller 1006.

The control method in accordance with the fifth embodiment of the present invention will be described with reference to FIGS. 21 to 25.

Figure 21:
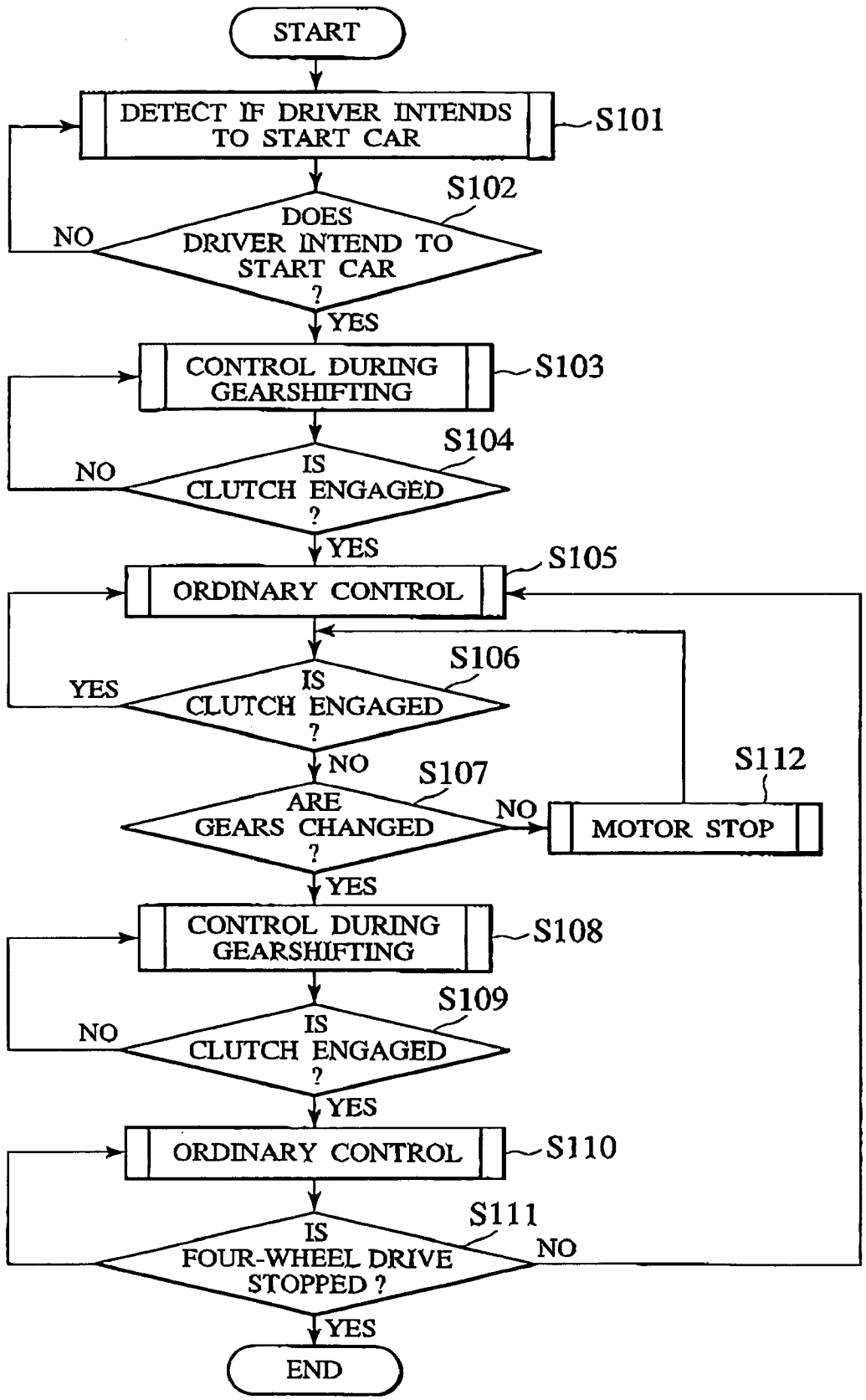
FIG. 21 is a flow chart showing the flow of control according to the preferred embodiments of the present invention.

FIG. 21 is a flow chart showing the flow of overall control. This control is applicable to the four-wheel-drive car mounted with the transmission with the clutch. The control is aimed at increasing acceleration performance when the car is started and acceleration performance and performance to get the car out of a mud during an upshift (for example when shifting from the 1st speed to the 2nd speed).

In step 101 (S101), in which the car idles with the wheel speed detected is zero, it is detected whether or not the driver intends to start the car. In step 102 (S102), according to the driver's intention detected whether to start the car or not, the operation proceeds to step 103 (S103) if it is detected that the driver intends to start the car, and the operation goes back to step 101 (S101) again if it is detected that the driver does not intend to start the car. In step 103 (S103), an operation is performed, in which the motor generates torque to apply a driving force to the rear wheels with the clutch disengaged. This operation continues until it is determined in step 104 (S104) that the clutch is engaged. After the clutch has been engaged, the operation proceeds to step 105 (S105). In step 105 (S105), control is provided as the hybrid four-wheel-drive car. When it is determined in step 106 (S106) that the clutch is disengaged, the driver's intention of upshift is detected in the next step 107 (S107). After the intention of upshift has been determined, the operation proceeds to step 108 (S108), in which the same control for generating the motor torque as in the earlier step 103 (S103) is provided. It is determined in step 109 (S109) whether or not the clutch is engaged. If it is determined that the clutch is engaged, the control as the hybrid four-wheel-drive car is provided in step 110 (S110). In step 111 (S111), it is determined whether or not to stop a four-wheel drive, that is to stop generation of the motor torque. If it is determined to stop motor torque generation in step 111 (S111), the operation is terminated. If it is determined not to stop motor torque generation in step 111 (Sill), then the operation returns to step 105 (S105) again. If the driver's intention of upshift is not determined in step 107 (S107), then the operation proceeds to step 112 (S112), in which the motor is stopped. The operation then returns to step 106 (S106).

Figure 22:
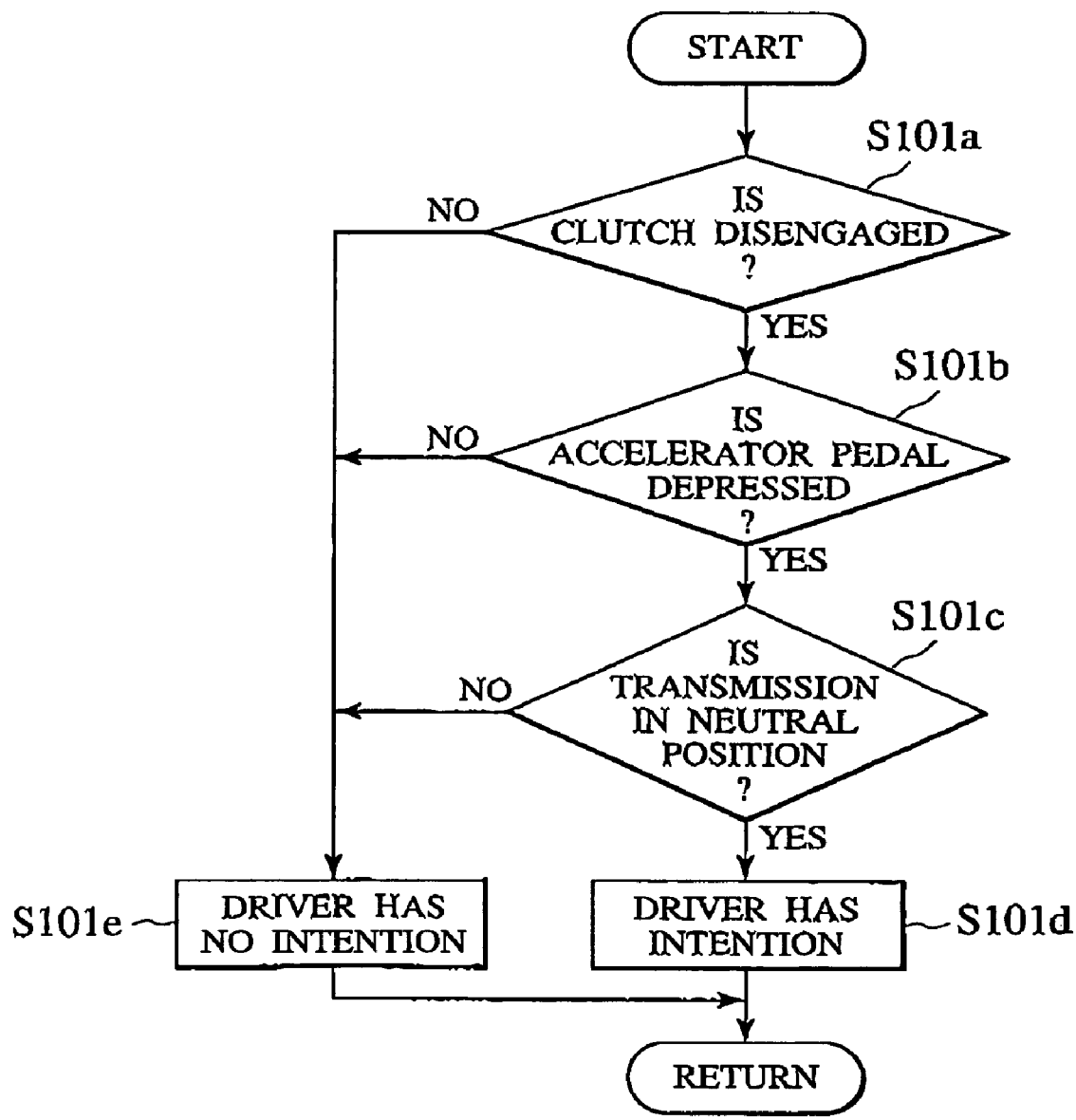
FIG. 22 is a flow chart showing the flow of determining an intention of a gearshift.

The method for detecting the driver's intention to start the car (step S101) and that for detecting the driver's intention to change gears (step S107) will be described with reference to FIG. 22. These steps aim to ensure that the motor positively produces a torque output if the driver does intend to start the car or change gears. The steps are intended, on the other hand, to prevent the torque from being transmitted from the motor to the wheels if the engine is raced with the transmission in the neutral position or the driver simply attempts to select another gear ratio (by operating a shift lever). It is therefore possible to produce a coast condition (in which the car is run from inertia with the transmission in the neutral position and the clutch disengaged). To accomplish this task, it is detected whether or not the clutch is disengaged in step S101a; if it is determined that the clutch is disengaged, the operation proceeds to step S101b and if it is determined otherwise, the operation proceeds to step S101e. In step S101b, the amount of accelerator pedal depression is identified. If it is determined in step S101b that the amount of accelerator pedal depression exceeds a predetermined value, it is detected in step S101c that the transmission is in a non-neutral position, that is, a gear ratio is selected. If it is determined that the transmission is in the non-neutral position, then in step S101d, it is determined that the driver intends to start the car or change gears. In conditions other than that described in the foregoing, it is determined that the driver has no intention to start the car or change gears and the operation proceeds to step 101e.

Figure 23:
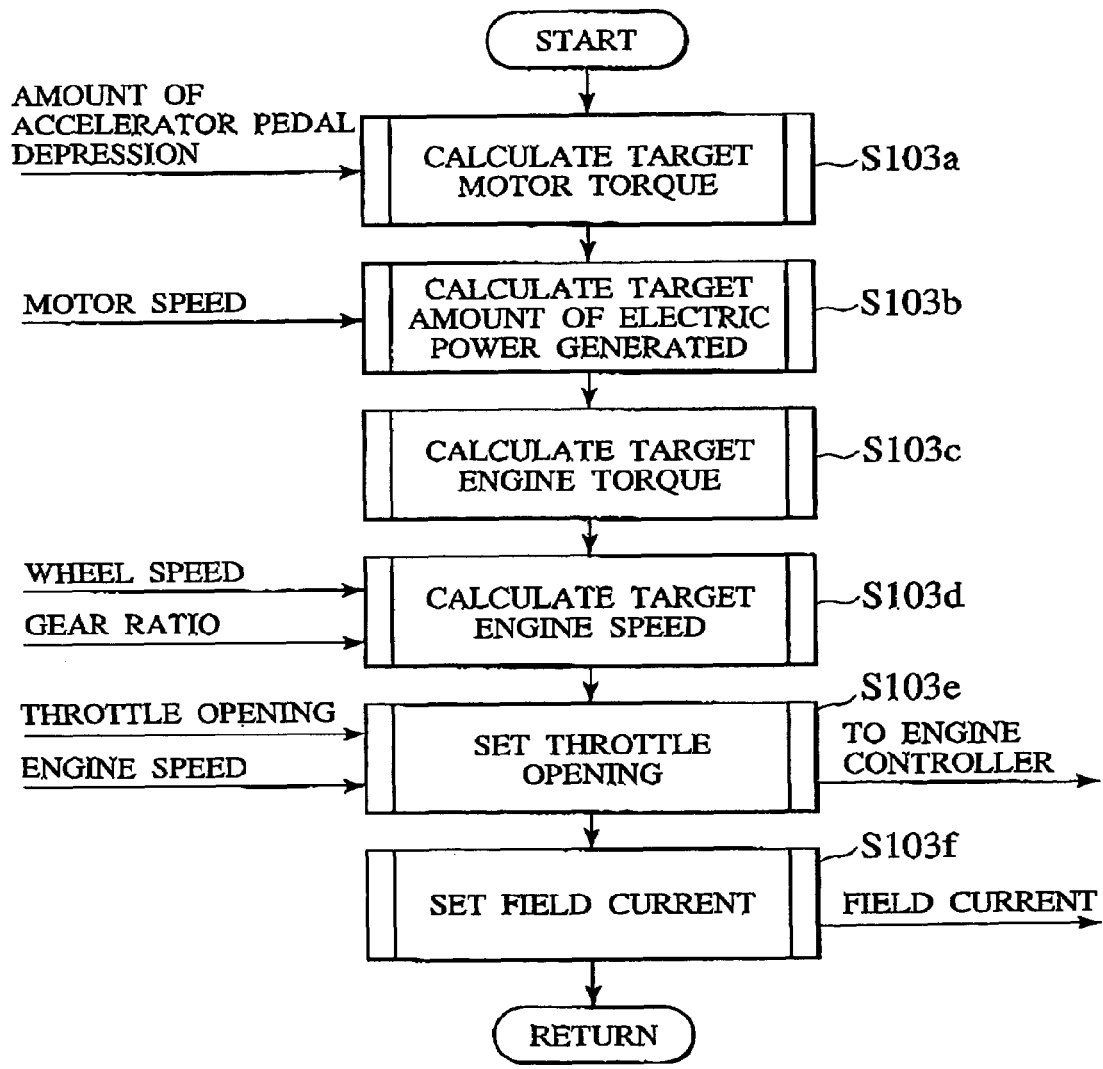
FIG. 23 is a diagram showing details of a control method during a shift gear.
Figure 24:
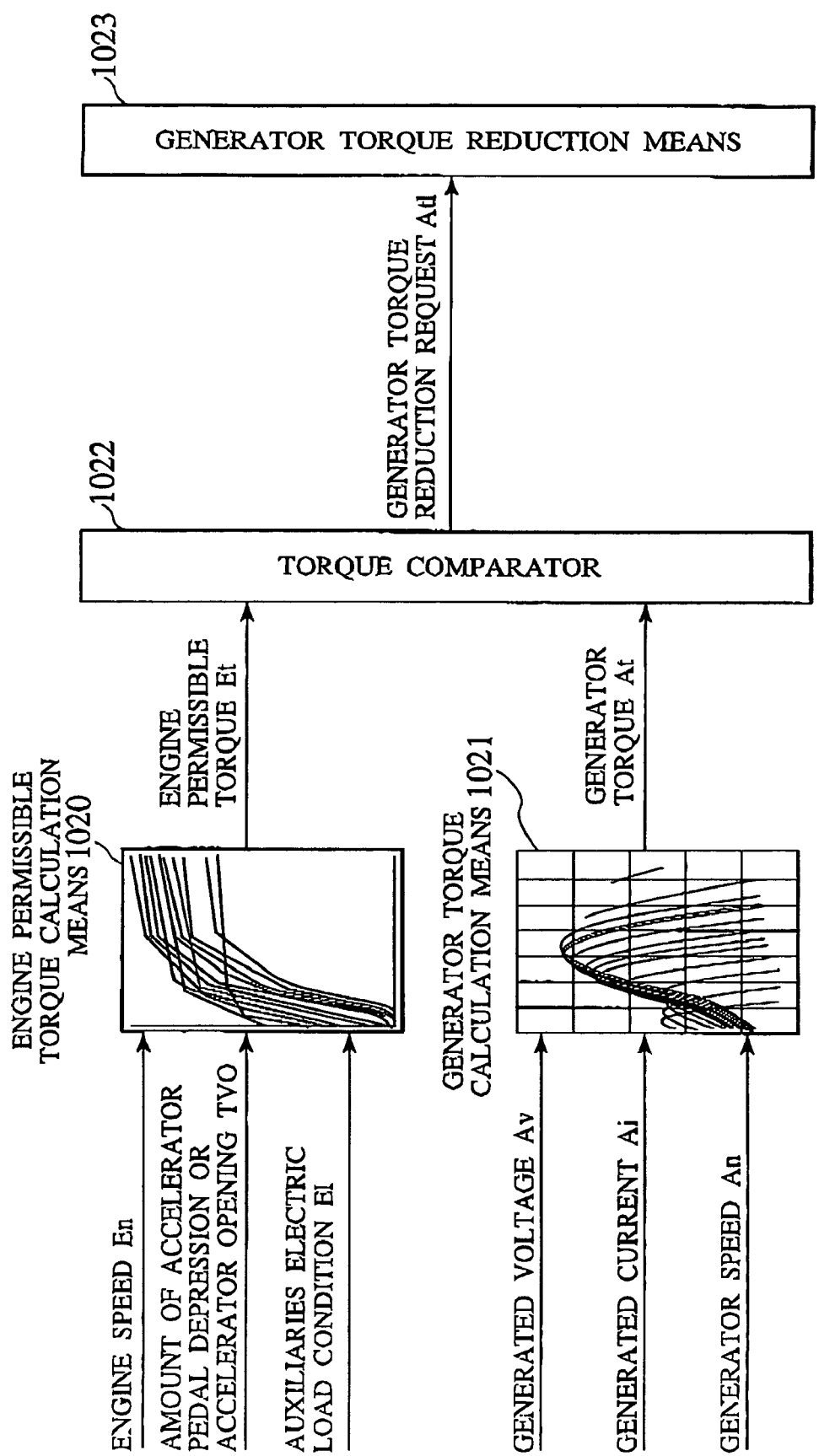
FIG. 24 is a diagram showing a method for avoiding engine stalling.

The control will be described with reference to FIG. 23 when it is determined that the driver intends to change gears. When it is determined that the driver intends to change gears, the motor torque target value is calculated from the amount of accelerator pedal depression in step S103a. Specifically, the value of the torque transmitted from the engine to the drive wheels pre-stored in memory is obtained based on the amount of accelerator pedal depression corresponding to the current engine speed and the gear ratio currently selected for use. Using the torque value obtained from memory, the target torque of the motor is calculated in consideration of a reduction ratio of a reduction gear associated with the motor. The target torque of the motor determined through these calculation processes does not give the driver an awkward feeling. In the next step S103b, the amount of electric power generated by the generator is set so as to obtain the target motor torque. When setting the amount of electric power generated by the generator, a target amount of electric power generated by the generator with a greater accuracy can be obtained if a motor-induced electric power is calculated by reading information on the motor speed. If the engine speed is known with the amount of electric power generated by the generator established, torque generated by the generator can also be found. This automatically obtains engine torque requirements. The target engine torque is calculated in step S103c. When the clutch is engaged, the closer the speed on an input side of the clutch, or the engine speed, is to the speed on an output side of the clutch, or the speed of an input shaft of the transmission, the smoother the engaging action. The speed of the input shaft of the transmission is determined by the speed of the wheels, that is the wheel speed, and the gear ratio currently selected of the transmission. These values are calculated to find the target engine speed. The operation then proceeds to step S103e. In step S103e, an engine output characteristics map previously stored in memory is searched through to set a throttle opening based on the target engine torque obtained in step S103c and the target engine speed obtained in step S103d. The throttle opening data is transmitted to the engine controller and the electronic control throttle is operated accordingly. Finally, in step S103f, the field current of the generator is controlled so as to obtain the desired amount of electric power generated by the generator.

When steps S103a through S103f are executed, the engine can stall due to an insufficient engine torque in the target engine speed. To eliminate this situation, the method depicted in FIG. 24 as detailed in the following is employed to monitor the condition at all times.

The engine controller 1008 calculates an engine permissible torque Et using engine permissible torque calculation means 1020. In this calculation process, the engine permissible torque calculation means 1020 uses the following data to find the engine permissible torque Et: an engine speed En detected by the engine speed sensor mounted in the engine 1001; a throttle opening or accelerator pedal depression amount TVO detected by the engine controller 1008 through the use of the throttle opening sensor; and an electric load condition of auxiliaries El detected by the engine controller 1008.

The engine permissible torque Et is the engine output torque, from which the torque required by the engine to autonomously turn by overcoming friction in the engine itself and in auxiliaries and the torque required by the engine to accelerate are subtracted. The engine decelerates or stalls, if a load exceeding the engine permissible torque Et is applied. A load limiter must therefore be installed in order that the engine permissible torque Et is not exceeded. The load limiter is set specifically as detailed in the following.

Power generation torque calculation means 1021 calculates a power generation torque At using a generator speed An. The generator speed An is calculated based on the following data. Specifically, the data are: a power generation voltage Av and a power generation current Ai detected by the 4WD controller 1006 through the use of the relay 1007 disposed between the generator 1002 and the electric motor 1005; and the engine speed En detected by the engine controller 1008 through the use of the engine speed sensor mounted in the engine. A torque comparator 1022 compares the engine permissible torque Et with the power generation torque At calculated through the procedures described above. If the power generation torque At exceeds the engine permissible torque Et, a generator torque reduction request Atl is issued to generator torque reduction means 1023. The generator torque reduction means 1023 reduces the field current of the generator 1002. Through these procedures, the engine can be prevented from stalling.

Figure 25:
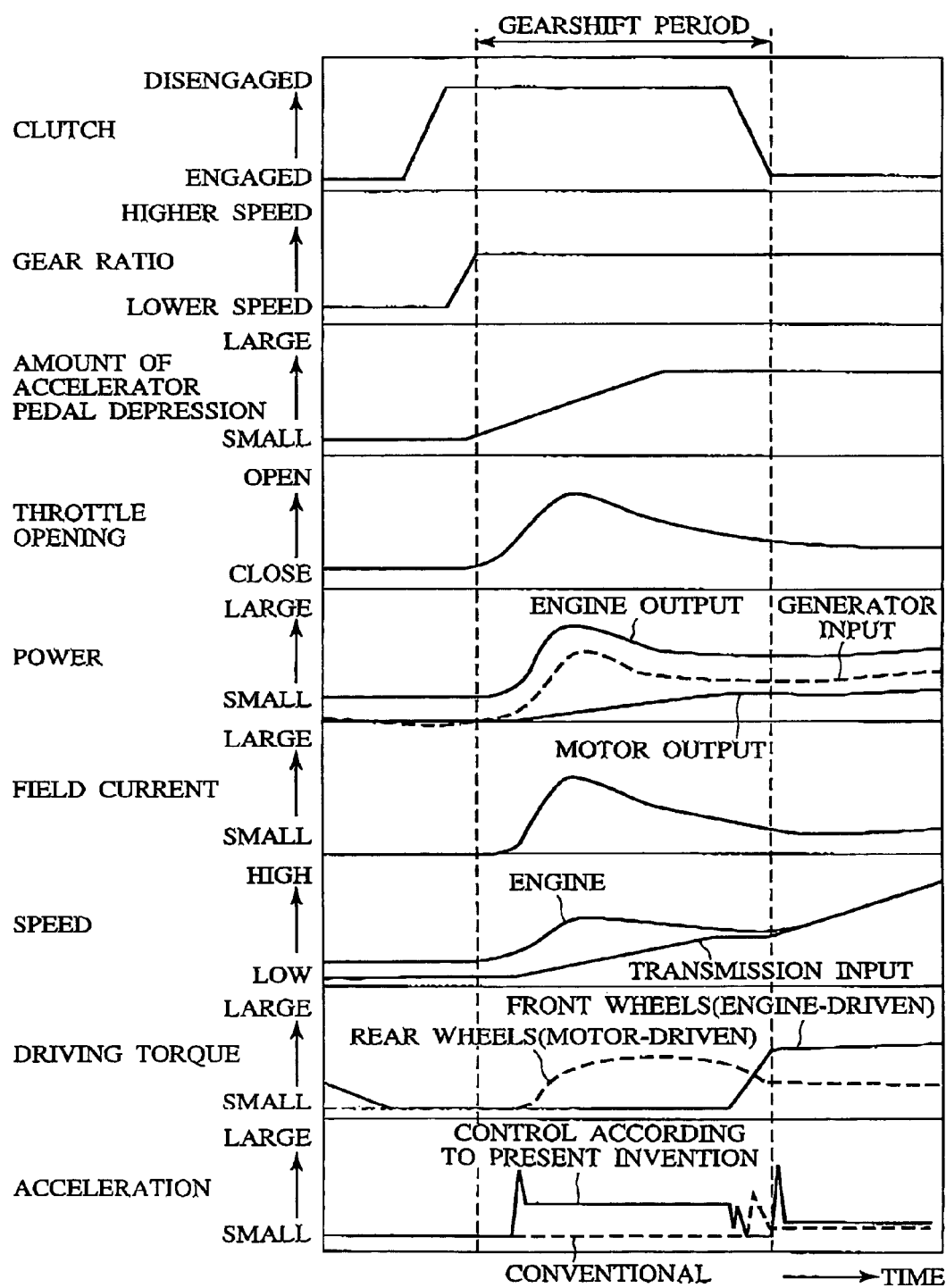
FIG. 25 is a diagram showing operations as controlled in accordance with the preferred embodiments of the present invention.

FIG. 25 shows an example of starting the car or changing gears by applying the control in accordance with the fifth embodiment of the present invention. In FIG. 25, the abscissa represents time. Given on the ordinate of FIG. 25 are the following placed from top downward in the following order: the clutch condition; the selected gear ratio; the amount of accelerator pedal depression; the throttle opening; a power; the field current, or the amount of electric power generated; speeds of the engine and the input shaft of the transmission; driving torque values of the rear wheels and the front wheels; and a car acceleration. The electronic control throttle achieves the specified throttle opening when the clutch is disengaged, a gear ratio is selected, and the accelerator pedal is depressed.

The engine output then increases and the field current increases. This increases the input to the generator, which suppresses increase in the engine speed. The driving force of the rear wheels increases, on the other hand, which accelerates the vehicle and increases the speed of the input shaft of the transmission to approach the speed of the engine. When the clutch is engaged again, the engine speed approaches the speed of the input shaft of the transmission. There is therefore a little change in vehicle acceleration when the clutch is engaged, achieving a smooth gearshift. In the driving torque, on the other hand, torque is output also to the rear wheels that are driven by the motor even when the clutch is disengaged, causing the vehicle to accelerate. In the conventional control not using the control described heretofore shown by the broken line, the driving force does not act while the clutch is disengaged and vehicle acceleration remains small. FIG. 25 demonstrates effectiveness of the control in accordance with the fifth embodiment of the present invention. The period of time during which the driving torque is lost is short even when gearshift is attempted in a mud and the vehicle does not stop. It is thus evident that the performance to get the car out of a mud has improved.

The control unit for the hybrid four-wheel-drive car 1100 driven by the driving force from the engine and that from the motor is formed as follows. Specifically, the control unit is provided with a processing unit 1030 that calculates a torque generating signal to be output to the motor when the car is started or gears are changed corresponding to an amount of accelerator depression signal. The processing unit 1030 calculates the torque generating signal when it determines that the car driver intends to start the car or change gears, as determined based on at least, the clutch position sensor based on the clutch position, and a non-neutral condition signal output based on the gear ratio, and the amount of accelerator pedal depression signal associated with the accelerator pedal as described in the foregoing.

The processing unit 1030 can perform the following tasks. Specifically, the processing unit 1030 receives an input of the motor speed to calculate the target amount of electric power generated by the generator. The processing unit 1030 calculates the target engine torque based on the target amount of electric power generated by the generator. The processing unit 1030 calculates the target engine speed using the data on the wheel speed and the gear ratio. The processing unit 1030 sets the throttle opening based on the throttle opening and the engine speed. The processing unit 1030 then produces an output of the set throttle opening to the engine controller.

Further, the processing unit 1030 can calculates the engine permissible torque. The processing unit 1030 can calculate the generator torque from the voltage and current generated by the generator and the generator speed. The processing unit 1030 then makes a comparison between the two torque values, thereby generating a generator torque reduction signal.

Further, the hybrid four-wheel-drive car 1100 is configured by providing the same with the following components. The components are specifically: the engine 1001 driving either pair of the front wheels 1014 or the rear wheels 1015; the motor 1005 driving the other pair of the front wheels 1014 or the rear wheels 1015; the generator 1002 driven by the engine 1001 and supplying the motor 1005 with electric power; the clutch 1012a disposed between the output shaft of the engine 1001 and the input shaft of the transmission 1012 and connecting or disconnecting the driving force; the transmission 1012 provided between the clutch 1012a and the wheels driven by the engine 1001, and selecting one gear ratio from among the plurality of predetermined gear ratios and thereby reducing and outputting the engine speed; the clutch position detecting device detecting the position of the clutch 1012a; the accelerator pedal sensor detecting the amount of accelerator pedal depression; the device detecting or estimating torque of the generator 1002; the gear ratio detecting device detecting the selected gear ratio of the transmission 1012, and the engine controller 1008 detecting the outputs from the clutch position detecting device, the accelerator pedal sensor, and the gear ratio detecting device and controlling the amount of electric power generated by the generator 1002 and the output from the engine 1001. Arrangements are made in the hybrid four-wheel-drive car 1100, in which, when the clutch position detecting device detects that the clutch is disengaged and the gear ratio detecting device detects the non-neutral position, a motor torque within the clutch disengagement period in accordance with the amount of accelerator pedal depression detected by the accelerator pedal sensor is generated and the car is driven based on the motor torque.

Arrangements are further made in the hybrid four-wheel-drive car 1100 by providing the car 1100 with the engine controller 1008 that issues a command for increasing the torque of the motor 1005 by increasing the amount of electric power generated by the generator 1002 and increasing the output of the engine 1001.

What is claimed is:

1. A driving apparatus for a hybrid car, comprising:
 a generator driven by an internal combustion engine drivingly rotating one pair of either front wheels or rear wheels;
 an electric motor driven through directly receiving an output from said generator and drivingly rotating the other pair of either said front wheels or said rear wheels; and
 a control unit controlling the driving of said generator and said electric motor;
 wherein said control unit limits the output of said generator when said internal combustion engine is determined to be in an overloaded condition or a nearly overloaded condition and increase a field current of said electric motor when the output of said generator is limited.

2. The driving apparatus for a hybrid car according to claim 1, wherein said control unit limits the output of said generator when said internal combustion engine can run into the overloaded condition.

3. The driving apparatus for a hybrid car according to claim 1, wherein said control unit determines that said internal combustion engine is in the overloaded condition and limits the output of said generator when a generator torque given to said internal combustion engine from said generator exceeds an internal combustion engine permissible torque, of which said generator is allowed to deprive.

4. The driving apparatus for a hybrid car according to claim 1, wherein said control unit determines that said internal combustion engine is in the overloaded condition and limits the output of said generator when detonation of said internal combustion engine is detected.

5. The driving apparatus for a hybrid car according to claim 1, wherein said control unit comprising:
 means for calculating a target torque of said electric motor based on a driver's torque requirement and a car speed;

means for calculating a target field current of said generator and a target field current of said electric motor from said target torque;

means for providing an output of a control signal for field current control means of said generator based on the target field current corresponding to said generator;

means for providing an output of a control signal for field current control means of said electric motor based on the target field current corresponding to said electric motor; and means for determining an overloaded condition of said internal combustion engine based on an operating condition of said generator and a predetermined generator permissible torque and providing an output of an output limitation request of said generator in accordance with said determination;

wherein said means for calculating said target field current gives target field current for limiting the output of said generator in accordance with said output limitation request to said means for providing the output of a control signal for the field current control means of said generator, if said internal combustion engine is in the overloaded condition.

6. The driving apparatus for a hybrid car according to claim 5, wherein said control unit includes means for calculating an increased field current corresponding to said electric motor for compensating for an output drop of said electric motor due to the output limitation of said electric motor in accordance with said output limitation request and said means for calculating said target field current calculates, if said internal combustion engine is in the overloaded condition, a target field current for increasing the field current of said electric motor based on said increased field current and gives the target field current thus obtained to said means for providing the output of a control signal for the field current control means of said generator.

7. The driving apparatus for a hybrid car according to claim 5, wherein said generator permissible torque is a limit value, with which acceleration of the hybrid car can be retained at a predetermined level or more even when the generator torque is given to said internal combustion engine from said generator, and said means for providing the output of an output limitation request comprises:

means for storing said generator permissible torque;

means for calculating a generator torque to be given to said internal combustion engine from said generator based on an output voltage, an output current, and a speed of said generator; and means for providing an output of said output limitation request if said generator torque is compared with said generator permissible torque and said generator torque exceeds said generator permissible torque.

8. The driving apparatus for a hybrid car according to claim 1, wherein said generator is used exclusively for driving said electric motor when said electric motor is operated to give an assist drive and is provided independently of an auxiliary generator driven by said internal combustion engine.

9. The driving apparatus for a hybrid car according to claim 1, wherein said control unit comprising:

means for calculating a target torque of said electric motor based on a driver's torque requirement and a car speed;

means for calculating a target field current of said generator and a target field current of said electric motor from said target torque, respectively;

means for providing an output of a control signal for field current control means of said generator based on the calculated target field current corresponding to said generator;

means for providing an output of a control signal for field current control means of said electric motor based on the calculated target field current corresponding to said electric motor; and means for determining an overloaded condition of said internal combustion engine based on said torque requirement, an operating condition of said internal combustion engine, an operating condition of said generator, and an operating condition of auxiliary machinery driven by said internal combustion engine, and providing an output of an output limitation request of said generator in accordance with said determination;

wherein said means for calculating said target field current of said generator gives the target field current for limiting the output of said generator in accordance with said output limitation request to said means for providing the output of a control signal for the field current control means of said generator, if said internal combustion engine is in the overloaded condition.

10. The driving apparatus for a hybrid car according to claim 9, wherein said control unit includes means for calculating an increased field current corresponding to said electric motor for compensating for an output drop of said electric motor due to the output limitation of said generator in accordance with said output limitation request and said means for calculating said target field current of said electric motor calculates, if said internal combustion engine is in the overloaded condition, a target field current for increasing the field current of said electric motor and gives the target field current thus obtained to said means for providing the output of a control signal for the field current control means of said electric motor.

11. The driving apparatus for a hybrid car according to claim 9, wherein said means for providing the output of an output limitation request comprising:

means for calculating a generator torque given to said internal combustion engine from said generator based on an output voltage, an output current, and a speed of said generator;

means for calculating an internal combustion engine permissible torque, of which said generator is allowed to deprive, based on said torque requirement that is an opening of an air control valve of said internal combustion engine or an amount of accelerator depression for controlling the opening of said air control valve, a speed of said internal combustion engine, and an operating condition of said auxiliary machinery; and means for providing an output of said output limitation request when said generator torque is compared with said internal combustion engine permissible torque and when said generator torque exceeds said internal combustion engine permissible torque.

12. The driving apparatus for a hybrid car according to claim 1, wherein said control unit comprising:

means for calculating a target torque of said electric motor based on a driver's torque requirement and a car speed;

means for calculating a target field current of said generator and a target field current of said electric motor from said target torque;

means for providing an output of a control signal for field current control means of said generator based on the target field current corresponding to said generator;

means for providing an output of a control signal for field current control means of said electric motor based on the target field current corresponding to said electric motor; and means for determining an overloaded condition of said internal combustion engine based on detection of detonation occurring in said internal combustion engine and providing an output of an output limitation request of said generator in accordance with said determination;

wherein said means for calculating said target field current gives the target field current for limiting the output of said generator in accordance with said output limitation request to said means for providing the output of a control signal for the field current control means of said generator, if said internal combustion engine is in the overloaded condition.

13. The driving apparatus for a hybrid car according to claim 12, wherein said control unit includes means for calculating an increased field current corresponding to said electric motor for compensating for an output drop of said electric motor due to the output limitation of said electric motor in accordance with said output limitation request and said means for calculating said target field current calculates, if said internal combustion engine is in the overloaded condition, a target field current for increasing the field current of said electric motor based on said increased field current and gives the target field current thus obtained to said means for providing the output of a control signal for the field current control means of said electric motor.

14. The driving apparatus for a hybrid car according to claim 12, wherein said means for providing the output of an output limitation request determines whether or not detonation occurs in said internal combustion engine based on an output signal from a detonation sensor mounted in said internal combustion engine or a detonation occurrence signal from an internal combustion engine control unit controlling driving of said internal combustion engine and, in accordance with said determination, provides an output of said output limitation request.

15. The driving apparatus for a hybrid car according to claim 1, wherein said control unit comprising:

means for calculating a target torque of said electric motor based on a driver's torque requirement and a car speed;

means for calculating a target field current of said generator and a target field current of said electric motor from said target torque;

means for providing an output of a control signal for field current control means of said generator based on the target field current corresponding to said generator;

means for providing an output of a control signal for field current control means of said electric motor based on the target field current corresponding to said electric motor; and means for determining an overloaded condition of said internal combustion engine based on said driver's torque requirement and said car speed and providing an output of an output limitation request of said generator in accordance with said determination;

wherein said means for calculating said target field current gives the target field current for limiting the output of said generator in accordance with said output limitation request to said means for providing the output of a control signal for the field current control means of said generator, if said internal combustion engine is in the overloaded condition.

16. The driving apparatus for a hybrid car according to claim 15, wherein said control unit includes means for calculating an increased field current corresponding to said electric motor for compensating for an output drop of said electric motor due to the output limitation of said electric motor in accordance with said output limitation request and said means for calculating said target field current calculates, if said internal combustion engine is in the overloaded condition, a target field current for increasing the field current of said electric motor based on said increased field current and gives the target field current thus obtained to said means for providing the output of a control signal for the field current control means of said electric motor.

17. The driving apparatus for a hybrid car according to claim 15, wherein said means for providing the output of an output limitation request comprising:

means for calculating acceleration of the hybrid car based on the maximum speed of all speeds of said front wheels and said rear wheels;

means for calculating an acceleration threshold value of the hybrid car based on said torque requirement that is an opening of an air control valve of said internal combustion engine or an amount of accelerator depression for controlling the opening of said air control valve; and means for providing an output of said output limitation request if said acceleration of the hybrid car is compared with said acceleration threshold value of the hybrid car and said acceleration of the hybrid car exceeds said acceleration threshold value of the hybrid car.

18. The driving apparatus for a hybrid car according to claim 1, wherein said control unit determines that said internal combustion engine is in the overloaded condition and limits the output of said generator when acceleration of the hybrid car exceeds an estimated acceleration of the hybrid car.

19. The driving apparatus for a hybrid car according to claim 1, wherein said control unit determines that said internal combustion engine is in the overloaded condition and limits the output of said generator when a generator torque given to said internal combustion engine from said generator exceeds a generator permissible torque, with which acceleration of the hybrid car can be retained at a predetermined level or more even when the generator torque is given to said internal combustion engine from said generator.

20. A hybrid car comprising:

an internal combustion engine, as a driving source, which drivingly rotates one pair of either front wheels or rear wheels; and an electric motor, as another driving source, which drivingly rotates the other pair of either said front wheels or said rear wheels;

a generator whose output is supplied directly to said electric motor for driving the latter, said generator being driven by said internal combustion engine, and the output from said generator is limited when said internal combustion engine is in an overloaded condition, and a control unit configured to increase a field current of said electric motor when the generator output is limited.

* * * * *